(12) United States Patent
Nakagawa et al.

(10) Patent No.: US 7,705,071 B2
(45) Date of Patent: Apr. 27, 2010

(54) AQUEOUS INK, INK-JET RECORDING METHOD, INK CARTRIDGE, RECORDING UNIT AND INK JET RECORDING APPARATUS

(75) Inventors: Kouhei Nakagawa, Yokohama (JP); Shinichi Hakamada, Kawasaki (JP); Tetsu Iwata, Yokohama (JP); Masashi Ogasawara, Machida (JP); Masashi Tsujimura, Kawasaki (JP); Shuichi Okazaki, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 11/674,357

(22) Filed: Feb. 13, 2007

(65) Prior Publication Data

US 2007/0191508 A1    Aug. 16, 2007

(30) Foreign Application Priority Data

Feb. 15, 2006 (JP) ............................. 2006-038199
Feb. 15, 2006 (JP) ............................. 2006-038264

(51) Int. Cl.
*C09D 11/10* (2006.01)
(52) U.S. Cl. .............. 523/160; 106/31.78; 106/31.86; 347/56; 347/87; 347/100
(58) Field of Classification Search ................. None
See application file for complete search history.

(56) References Cited

U.S. PATENT DOCUMENTS

| | | | |
|---|---|---|---|
| 4,723,129 A | 2/1988 | Endo et al. ............ 346/1.1 |
| 4,740,796 A | 4/1988 | Endo et al. ............ 346/1.1 |
| 5,085,698 A * | 2/1992 | Ma et al. ............... 524/388 |
| 5,658,376 A * | 8/1997 | Noguchi et al. ....... 106/31.43 |
| 5,782,967 A | 7/1998 | Shirota et al. ......... 106/31.58 |
| 5,835,116 A | 11/1998 | Sato et al. ............. 347/98 |
| 6,027,210 A | 2/2000 | Kurabayashi et al. ... 347/100 |
| 6,214,963 B1 | 4/2001 | Noguchi et al. ........ 528/71 |
| 6,238,045 B1 | 5/2001 | Ono et al. ............. 347/96 |
| 6,398,355 B1 | 6/2002 | Shirota et al. ......... 347/100 |
| 6,412,936 B1 | 7/2002 | Mafune et al. ......... 347/100 |
| 6,552,156 B2 | 4/2003 | Noguchi et al. ........ 528/71 |
| 6,676,254 B2 | 1/2004 | Nagashima et al. ..... 347/100 |
| 6,698,876 B2 | 3/2004 | Sato et al. ............. 347/100 |
| 6,733,120 B2 | 5/2004 | Ogasawara et al. ..... 347/100 |
| 6,929,362 B2 | 8/2005 | Takada et al. ......... 347/100 |
| 6,932,465 B2 | 8/2005 | Nito et al. ............. 347/96 |

(Continued)

FOREIGN PATENT DOCUMENTS

EP          556649 A1 *   8/1993

(Continued)

*Primary Examiner*—David Wu
*Assistant Examiner*—Vu Nguyen
(74) *Attorney, Agent, or Firm*—Fitzpatrick, Cella, Harper & Scinto

(57) ABSTRACT

An aqueous ink to be used in an ink jet recording method that an ink is ejected from a recording head by the action of thermal energy, wherein the ink contains a pigment, a polymer and a water-soluble organic solvent, the hydrophilicity δm of the pigment falls within a range of from 21.5 or more to 23.5 or less, and the content (mass %) of the water-soluble organic solvent is from 5.0 mass % or more to 17.5 mass % or less with respect to the whole mass of the aqueous ink.

17 Claims, 8 Drawing Sheets

U.S. PATENT DOCUMENTS

| | | | |
|---|---|---|---|
| 6,935,732 B2 | 8/2005 | Takada et al. | 347/96 |
| 7,005,461 B2 | 2/2006 | Sanada et al. | 523/160 |
| 7,141,105 B2 | 11/2006 | Udagawa et al. | 106/31.49 |
| 7,160,376 B2 | 1/2007 | Watanabe et al. | 106/31.6 |
| 7,185,978 B2 | 3/2007 | Nagashima et al. | 347/100 |
| 7,195,340 B2 | 3/2007 | Nagashima et al. | 347/56 |
| 7,267,717 B2 | 9/2007 | Watanabe et al. | 106/31.6 |
| 7,276,110 B2 | 10/2007 | Tsujimura et al. | 106/31.27 |
| 7,276,112 B2 | 10/2007 | Tokuda et al. | 106/31.6 |
| 2004/0204514 A1* | 10/2004 | Sunamori et al. | 523/160 |
| 2004/0242726 A1 | 12/2004 | Waki et al. | 523/160 |
| 2004/0266909 A1 | 12/2004 | Segawa | 523/160 |
| 2005/0024458 A1 | 2/2005 | Sanada et al. | 347/100 |
| 2005/0132931 A1* | 6/2005 | Ham et al. | 106/499 |
| 2005/0204955 A1 | 9/2005 | Nagashima et al. | 106/31.59 |
| 2005/0219341 A1 | 10/2005 | Nito et al. | 347/100 |
| 2005/0284330 A1* | 12/2005 | Jackson | 106/31.6 |
| 2006/0000386 A1* | 1/2006 | Hakamada et al. | 106/31.13 |
| 2006/0007288 A1 | 1/2006 | Takada et al. | 347/100 |
| 2006/0007289 A1* | 1/2006 | Nito et al. | 347/100 |
| 2006/0066699 A1 | 3/2006 | Tokuda et al. | 347/100 |
| 2006/0089424 A1 | 4/2006 | Sanada et al. | 523/160 |
| 2006/0098067 A1 | 5/2006 | Imai et al. | 347/100 |
| 2006/0098068 A1 | 5/2006 | Hakamada et al. | 347/100 |
| 2006/0103704 A1 | 5/2006 | Hakamada et al. | 347/100 |
| 2006/0192827 A1 | 8/2006 | Takada et al. | 347/100 |
| 2006/0196389 A1 | 9/2006 | Tsuji et al. | 106/31.43 |
| 2007/0029522 A1 | 2/2007 | Udagawa et al. | 252/301.16 |
| 2007/0034114 A1 | 2/2007 | Udagawa et al. | 106/31.15 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0188572 A1 | 8/2007 | Takayama et al. | 347/100 |
| 2007/0191508 A1 | 8/2007 | Nakagawa et al. | 523/160 |

FOREIGN PATENT DOCUMENTS

| | | |
|---|---|---|
| JP | 9-194780 | 7/1997 |
| JP | 2003-147243 | 5/2003 |
| JP | 2004-217765 | 8/2004 |
| JP | 2005-298610 A | 10/2005 |
| WO | WO 2004/067287 A1 | 8/2004 |

\* cited by examiner

AQUEOUS INK, INK-JET RECORDING METHOD, INK CARTRIDGE, RECORDING UNIT AND INK JET RECORDING APPARATUS

BACKGROUND OF THE INVENTION

1. Field of the Invention

The present invention relates to an aqueous ink (hereinafter referred to as "ink") containing a pigment dispersed with a polymer, and to an ink jet recording method, an ink cartridge, a recording unit and an ink jet recording apparatus using the ink.

2. Description of the Related Art

It has been well known to use an ink (pigment ink) containing a pigment as a coloring material in order to improve the light fastness, gas fastness and water fastness of an image obtained by an ink jet recording method. It has been recently proposed to select a pigment capable of improving light fastness and gas resistance and use the pigment in an ink because the kind of a pigment used affects the light fastness and gas fastness of an image obtained with the ink (see Japanese Patent Application Laid-Open No. 2004-217765).

However, a pigment ink involves a problem that the pigment ink is liable to cause clogging at an orifice and in an ink flow path attending on evaporation of water from an ejection opening compared with an ink (dye ink) containing a dye. In order to solve such a problem, many proposals have been made in which the kind of a water-soluble organic solvent used in an ink is considered, or the properties of a pigment or a polymer (dispersant) for dispersing the pigment are defined (see Japanese Patent Application Laid-Open Nos. H09-194780 and 2003-147243).

The present inventors carried out the following investigation for providing an ink excellent in reliability (storage stability and ejection stability) and moreover in image quality (fixability and highlighter resistance). More specifically, a plurality of inks respectively containing polymer dispersion pigments (pigments in a state dispersed by a polymer) different from each other in surface treatment of the pigments was prepared. These inks were separately ejected by means of an ink jet recording apparatus to evaluate them as to reliability. Incidentally, a thermal type ink jet recording apparatus that an ink is ejected by the action of thermal energy was used in the investigation. As a result, it was found that a part of the inks evaluated could not achieve good ejection characteristics (frequency responsiveness, and stable ejection volume and ejection velocity). In particular, this tendency was marked in inks containing a polymer dispersion pigment obtained by dispersing a pigment, whose hydrophilicity δm falls within a range of from 21.5 or more to 23.5 or less, as will be described below.

In addition, the present inventors confirmed that the cause for the variation of the ejection characteristics is attributable to a new phenomenon, which will be described subsequently, and not to clogging at an ejection opening (orifice) known in the prior art. More specifically, it was found that when an ink is continuously ejected from a recording head, deposit adheres to the interior of an ink flow path and the vicinity of an ejection opening to close the ink flow path, and so this may cause the case where sufficient ejection characteristics can not be achieved.

SUMMARY OF THE INVENTION

Accordingly, the present invention provides an ink that can achieve good ejection stability when the ink is used in an ink jet recording method that an ink is ejected by the action of thermal energy though the ink contains a pigment dispersed by a polymer. The present invention also provides an ink that can be normally ejected from a recording head by a prescribed recovery operation even after an ink cartridge storing the ink is installed in the recording head and left to stand for a long period of time, and is also excellent in reliability. The present invention further provides an ink jet recording method, an ink cartridge, a recording unit and an ink jet recording apparatus using the above-described ink.

The above-described present invention can be achieved as described below. More specifically, an ink according to the present invention is an aqueous ink to be used in an ink jet recording method that an ink is ejected from a recording head by the action of thermal energy, wherein the ink contains a pigment, a polymer and a water-soluble organic solvent, the hydrophilicity δm of the pigment falls within a range of from 21.5 or more to 23.5 or less, and the content (mass %) of the water-soluble organic solvent is from 5.0 mass % or more to 17.5 mass % or less with respect to the whole mass of the aqueous ink.

An ink according to another embodiment of the present invention is an aqueous ink to be used in an ink jet recording method that an ink is ejected from a recording head by the action of thermal energy, wherein the ink contains a pigment, a polymer and a water-soluble organic solvent, the pigment is C.I. Pigment Violet 23, and the content (mass %) of the water-soluble organic solvent is from 5.0 mass % or more to 17.5 mass % or less with respect to the whole mass of the aqueous ink.

An ink according to a further embodiment of the present invention is an aqueous ink to be used in an ink jet recording method that an ink is ejected from a recording head by the action of thermal energy, wherein the ink contains C.I. Pigment Violet 23 and has a maximum absorption wavelength each in a wavelength range of from 530 nm or more to 540 nm or less and in a wavelength range of from 550 nm or more to 570 nm or less, and the relationship between an absorbance (A) at the maximum absorption wavelength located in the wavelength range of from 530 nm or more to 540 nm or less and an absorbance (B) at the maximum absorption wavelength located in the wavelength range of from 550 nm or more to 570 nm or less satisfies the conditions of the following expression (1):

$$0.93 \leq (B)/(A) \leq 0.97 \tag{1}$$

An ink jet recording method according to a further embodiment of the present invention is an ink jet recording method including ejecting an ink by the action of thermal energy to conduct recording on a recording medium, wherein the above-described aqueous ink is used.

An ink cartridge according to a yet still further embodiment of the present invention is an ink cartridge including an ink storage portion storing an ink, wherein the ink stored is the above-described aqueous ink.

A recording unit according to a yet still further embodiment of the present invention is a recording unit including an ink storage portion storing an ink and a recording head for ejecting the ink, wherein the ink stored is the above-described aqueous ink.

An ink jet recording apparatus according to a yet still further embodiment of the present invention is an ink jet recording apparatus including an ink storage portion storing an ink and a recording head for ejecting the ink, wherein the ink stored is the above-described aqueous ink.

According to the present invention, there can be provided an ink that can achieve good ejection stability when the ink is used in an ink jet recording method that an ink is ejected by the action of thermal energy though the ink contains a pigment dispersed by a polymer. The invention can also provide an ink that can be normally ejected from a recording head by a prescribed recovery operation even after an ink cartridge storing the ink is installed in the recording head and left to stand for a long period of time, and is also excellent in reliability. Further, an ink jet recording method, an ink cartridge, a recording unit and an ink jet recording apparatus using the above-described ink can be provided.

Further features of the present invention will become apparent from the following description of exemplary embodiments with reference to the attached drawings.

DESCRIPTION OF THE EMBODIMENTS

The present invention will hereinafter be described in detail by exemplary embodiments. The present inventors have found in the course of the investigation for solving the above problem that there is a considerable correlation between the hydrophilicity δm of a pigment and the deposit caused within an ink flow path and the vicinity of an ejection opening. More specifically, it has been found that when an ink containing a polymer dispersion pigment obtained by dispersing a pigment whose hydrophilicity δm falls within a range of from 21.5 or more to 23.5 or less is continuously ejected, deposit particularly markedly occurs within the ink flow path and in the vicinity of the ejection opening. Thus, the present inventors have carried out a further investigation for providing a highly reliable ink capable of achieving good ejection characteristics even when a polymer dispersion pigment obtained by dispersing the pigment having such surface properties is used.

(Presence Of Problem)

The details of completion of the invention will be first described in detail. The present inventors have carried out an investigation as to an ink containing a polymer dispersion pigment capable of stably providing an image having higher light fastness and gas fastness and satisfactory water fastness and scratch resistance compared with a conventional ink jet ink. As a result, it has been found that when an ink containing a polymer dispersion pigment obtained by dispersing a pigment whose hydrophilicity δm falls within a range of from 21.5 or more to 23.5 or less with a polymer is continuously ejected by means of a thermal type ink jet recording apparatus, the following phenomenon is caused. More specifically, it has been confirmed that in this case, deposit adheres to the interior of an ink flow path and the vicinity of an ejection opening in particular and ejection stability is lowered by this deposit. Thus the present inventors have sought the cause of such phenomenon. As a result, the present inventors have come to the conclusion that the following phenomenon is markedly caused when such a polymer dispersion pigment as described above is combined with an ink jet recording system.

(Mechanism of Occurrence of Deposit)

Figures 1A, 1B, 1C, 1D:
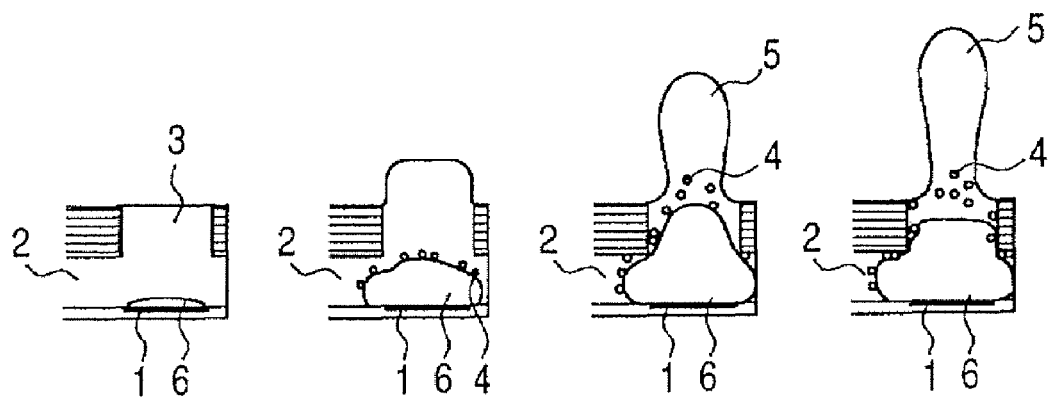
FIGS. 1A, 1B, 1C, 1D, 1E, 1F, 1G and 1H typically illustrate the mechanism of occurrence of deposit.
Figures 1E, 1F, 1G, 1H:
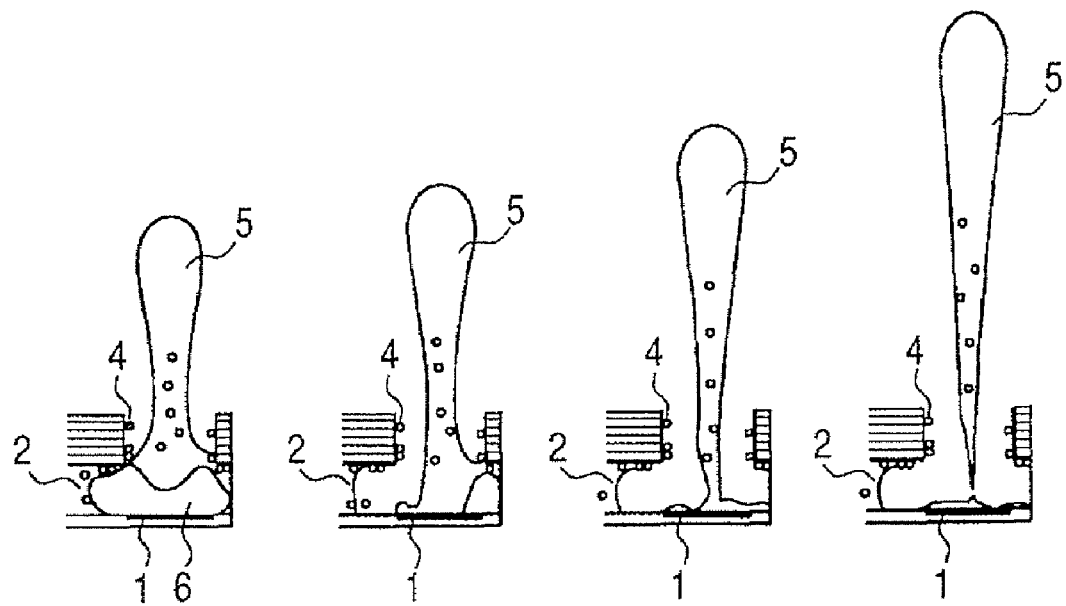

FIGS. 1A, 1B, 1C, 1D, 1E, 1F, 1G and 1H typically illustrate the mechanism of occurrence of deposit in the vicinity of an ejection opening when a thermal type ink jet recording apparatus is used. FIG. 1A illustrates a state that a film-like bubble 6 has been formed on a heater 1. FIGS. 1B, 1C, 1D, 1E, 1F, 1G and 1H respectively illustrated states after about 1 μsecond, about 2.5 μseconds, about 3 μseconds, about 4 μseconds, about 4.5 μseconds, about 6 μseconds and about 9 μseconds from the state of FIG. 1A. Incidentally, in FIGS. 1A, 1B, 1C, 1D, 1E, 1F, 1G and 1H, a horizontally hatched portion illustrates an orifice plate or a wall of a flow path.

As illustrated in FIG. 1A, the bubble 6 is first formed in the interior of an ink flow path 2 on the heater 1 attending on energizing to the heater 1 based on a recording signal or the like. At this time, the temperature of an ink in the vicinity of the heater 1 is raised to about 200° C. In the ink with the raised temperature, a pigment dispersion undergoes dispersion breakdown, and phenomena such as desorption of a dispersant (polymer) from the pigment and fragmentation of the pigment occur. As a result, the pigment, whose dispersed state has been instabilized, is present in a state mixed in the ink. At this time, the dispersion breakdown is caused when adsorbability of the polymer on the pigment is particularly weak, or when the polymer in an amount necessary for the pigment to retain a stably dispersed state is not adsorbed on the pigment. Majority of the pigment insufficient in the dispersed state is in the following state. More specifically, phenomena such as desorption of the polymer from the pigment, fragmentation of the pigment and moreover a change of state that the polymer is dissolved in the ink rapidly and excessively occur, so that the pigment in the unstably dispersed state comes to be present in a great amount.

Thereafter, as illustrated in FIGS. 1B and 1C, the volume of the bubble rapidly expands in about 2.5 μseconds. The ink with the raised temperature is cooled attending on this expansion. The pigment in the unstably dispersed state comes to fail to retain the dispersed state as the temperature of the ink becomes lower, so that aggregation of the pigment occurs, and a pigment precipitated in the ink appears. Pigment aggregates 4 precipitated in such a manner remain in the interior of the ink flow path 2 and some of them adhere to the wall of the flow path though part of them may be ejected from an ejection opening 3 in a state contained in an ink droplet 3. It is considered that the aggregates 4 precipitated in the ink deposit on the wall of the flow path.

The present inventors infer that the cause for which the ink containing the polymer dispersion pigment obtained by dispersing the pigment, whose hydrophilicity δm falls within a range of from 21.5 or more to 23.5 or less, by the polymer, is liable to cause the problem that the dispersion breakdown of the pigment is liable to occur, and the ejection stability is lowered by the deposit occurred is attributable to the following. First, it is considered that the major cause for which such an ink specifically increases the adhesion of the deposit to the ink flow path and the vicinity of the ejection opening compared with other pigment inks is attributable to the weak adsorbability of the polymer on the pigment. More specifically, since the pigment having the hydrophilicity δm of 21.5 or more has relatively high hydrophilic property, the polymer functioning as the dispersant is easy to be desorbed. Therefore, dispersion breakdown easily and rapidly progresses when the pigment is used such a system that an ink is ejected from a recording head by the action of thermal energy as described above. As a result, it is inferred that the deposit occurs within the ink flow path and in the vicinity of the ejection opening.

Incidentally, it was confirmed that the adhesion of the deposit to the interior of the ink flow path and the vicinity of the ejection opening is inhibited when an ink containing a polymer dispersion pigment obtained by dispersing a pigment having a hydrophilicity higher than 23.5 with a polymer is used. The reason why the adhesion of the deposit is decreased when the ink containing the pigment having the hydrophilicity higher than 23.5 is unknown. However, the present inventors infer the reason as follows. More specifically, even in the case where the pigment having the hydrophilicity higher than 23.5 is dispersed with the polymer, the polymer dispersion pigment is in a state that the polymer is hard to be adsorbed on the surface of the pigment. However, the hydrophilic property of the pigment itself greatly increases when the hydrophilicity $δm$ exceeds the borderline of 23.5, so that a dispersion breakdown product occurred can also retain high water solubility even when the dispersion breakdown of the pigment dispersion caused by the heat upon ejection progresses. As a result, when the ink containing the pigment having the hydrophilicity higher than 23.5 is used, the dispersion breakdown product occurred is discharged out of the ink flow path together with the ink without precipitation, so that it is considered that deposit scarcely adheres to the interior of the ink flow path and the vicinity of the ejection opening.

Methods for Solving the Problem

The present inventors have then carried out an investigation for providing an ink capable of inhibiting the dispersion breakdown of a pigment dispersion caused by the heat upon ejection as much as possible even when the polymer dispersion pigment obtained by dispersing a pigment whose hydrophilicity $δm$ falls within a range of from 21.5 or more to 23.5 or less is used. As a result, it has been found that there are two methods for solving the above problem. The two methods that can solve the problem of the present invention will hereinafter be described respectively.

(First Method)

The first method for solving the problem of the present invention is a method that optimizing the content (mass %) of a water-soluble organic solvent in an ink. Specifically the content (mass %) of the water-soluble organic solvent in the ink containing a polymer dispersion pigment obtained by dispersing a pigment whose hydrophilicity $δm$ falls within a range of from 21.5 or more to 23.5 or less with a polymer is settled to from 5.0 mass % or more to 17.5 mass % or less. It has been found that according to such first method, the deposit within the ink flow path and in the vicinity of the ejection opening can be effectively reduced irrespective of the kind of the water-soluble organic solvent. The first embodiment of the ink constituted as above-described first method of the present invention will hereinafter be called as a "first ink".

As a result of the investigation about the effect of the content of the water-soluble organic solvent by the present inventors, the affinity of an aqueous medium in an ink for the hydrophobic portion of the polymer functioning as a dispersant becomes greater as the content of the water-soluble organic solvent in the ink increases. In other words, it has been found that the adsorbability of the polymer on the pigment tends to become relatively less as the content of the water-soluble organic solvent increases. In addition, a highly hydrophilic pigment having a hydrophilicity $δm$ of 21.5 or more is originally weak in the adsorbability between the surface of the pigment and the hydrophobic portion of the polymer. Therefore, the above-described pigment is liable to be particularly affected by the water-soluble organic solvent in the ink.

Thus the present inventors have carried out an investigation. As a result, the following fact has been found. More specifically, it has been found that even when a polymer dispersion pigment high in hydrophilic property of which the hydrophilicity $δm$ is 21.5 or more to 23.5 or less is used, the dispersion breakdown of the polymer dispersion pigment can be inhibited by settling the content of the water-soluble organic solvent in the ink within a specific range. More specifically, when the content (mass %) of the water-soluble organic solvent in the ink is 17.5 mass % or less with respect to the whole mass of the ink, affinity between the hydrophobic portion of the surface of the pigment and the hydrophobic portion of the polymer becomes greater compared with affinity between the aqueous medium and the hydrophobic portion of the polymer. As a result, it is inferred that the dispersion breakdown of the pigment dispersion by the heat upon ejection can be inhibited by optimizing the content of the water-soluble organic solvent in the ink.

As a result of a further investigation by the present inventors, it has been found that the content (mass %) of the water-soluble organic solvent is required to be 5.0 mass % or more with respect to the whole mass of the ink. If the content of the water-soluble organic solvent is less than 5.0 mass %, the resulting ink becomes poor in moisture retention ability though the occurrence of the deposit is inhibited, so that ejection failure due to precipitation of the pigment and clogging at an ejection opening attending on evaporation of water in the vicinity of the ejection opening may occur in some cases. The content of the water-soluble organic solvent in the ink (the content of the water-soluble organic solvent/the content of the pigment) is favorably 2.5 times or more to 17.0 times or less based on the content of the pigment in the ink.

(Second Method)

The second method for solving the problem of the present invention is a method that when C.I. Pigment Violet 23 is used as a pigment having a hydrophilicity $δm$ of from 21.5 or more to 23.5 or less, a pigment having a specific absorption wavelength by adjusting, for example, the dispersing state of the pigment is used as the pigment. It has been found that according to such second method, the deposit within the ink flow path and in the vicinity of the ejection opening can be effectively reduced irrespective of the kind of the water-soluble organic solvent. The second embodiment of the ink constituted as above-described second method of the present invention will hereinafter be called as a "second ink".

The present inventors have carried out an investigation for providing an ink having excellent storage stability, ejection stability and color developability by selecting C.I. Pigment Violet 23 as an exemplary pigment having a hydrophilicity $δm$ of from 21.5 or more to 23.5 or less. More specifically, several pigment dispersions have been prepared with the dispersing conditions of C.I. Pigment Violet 23 varied to make investigation. As a result, it has been found that the light absorption characteristics of the pigment dispersion greatly participate in ejection characteristics and color developability.

Figure 8:
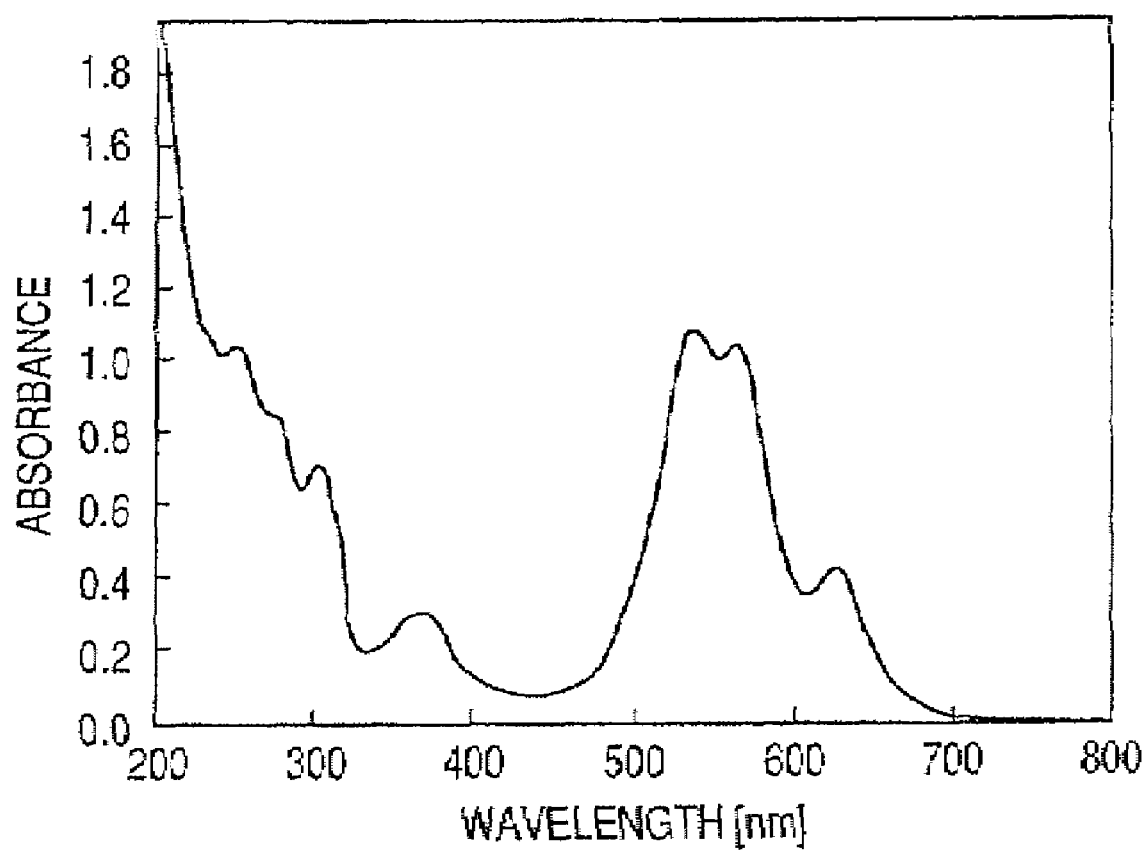
FIG. 8 is a graph illustrating an exemplary absorption spectrum of C.I. Pigment Violet 23.

The relationship among light absorption characteristics, dispersing conditions and ejection characteristics in C.I. Pigment Violet 23 will hereinafter be described. As illustrated in FIG. 8, a liquid containing a pigment dispersion of C.I. Pigment Violet 23 has a maximum absorption wavelength each in a wavelength range of from 530 nm or more to 540 nm or less, in a wavelength range of from 550 nm or more to 570 nm or less and in a wavelength range of from 620 nm or more to 630 nm or less.

As a result of the investigation by the present inventors, it has been found that when the dispersing conditions are varied upon the preparation of pigment dispersions, the absorbance proportion among these 3 maximum absorption wavelengths is somewhat regularly varied. More specifically, the kind of a dispersing machine, dispersing time, peripheral speed, and the diameter and kind of beads were changed to prepare pigment dispersions with the dispersing conditions varied. The light absorption characteristics of these pigment dispersions were respectively measured, whereby the following fact was found.

More specifically, it has been found that when the dispersing conditions are severely controlled, the absorbance proportion among the above-described 3 maximum absorption wavelengths tends to vary in the following manner. First, the proportion [(B)/(A)] of the absorbance (B) at the maximum absorption wavelength located in the wavelength range of from 550 nm or more to 570 nm or less to the absorbance (A) at the maximum absorption wavelength located in the wavelength range of from 530 nm or more to 540 nm or less tends to become large. The proportion [(C)/(A)] of the absorbance (C) at the maximum absorption wavelength located in the wavelength range of from 620 nm or more to 630 nm or less to the absorbance (A) at the maximum absorption wavelength located in the wavelength range of from 530 nm or more to 540 nm or less also tends to become large.

The present inventors have prepared a plurality of inks by adding a water-soluble organic solvent generally used in ink jet inks and water to a plurality of pigment dispersions of C.I. Pigment Violet 23, which were different in the dispersing conditions from each other. These inks have been separately charged into a thermal type ink jet recording apparatus and continuously ejected to make investigation in detail on its relationship with the above-described deposit adhered to the interior of the ink flow path and the vicinity of the ejection opening. As a result, it has been found that the deposit adheres to the interior of the ink flow path and the vicinity of the ejection opening in plenty, whereby lowering of ejection stability occurs when the proportion of the absorbance (B) to the absorbance (A) does not satisfy the conditions of the following expression (1):

$$0.93 \leq (B)/(A) \leq 0.97 \qquad (1).$$

The reason why the deposit adheres to the interior of the ink flow path and the vicinity of the ejection opening when an ink which does not satisfy the above range is continuously ejected is unknown. However, the present inventors infer the reason as follows.

Case where the Value of (B)/(A) is Less than 0.93

A liquid (aqueous ink) containing a pigment dispersion of C.I. Pigment Violet 23 having a (B)/(A) value less than 0.93 is insufficient in the dispersed state of the pigment. More specifically, coarse particles whose surfaces are cracked are present in plenty in the liquid containing the above-described pigment dispersion. Since the specific surface area of a pigment becomes small as the proportion of the pigment present in the state of coarse particles are large, the adsorption of the polymer (dispersant) on the surface of the pigment also becomes small. The polymer is repeatedly adsorbed on and desorbed from the pigment in the liquid containing the pigment dispersion. In other words, it is considered that the polymer is repeatedly adsorbed on the pigment and desorbed from the pigment to be dissolved in the liquid. As described above, C.I. Pigment Violet 23 having a hydrophilicity δm of from 21.5 or more to 23.5 or less is high in the hydrophilic property of the pigment, so that it is considered that the adsorption of the polymer is hard to occur though the desorption of the polymer is easy to occur. Therefore, it is considered that the pigment in the liquid containing the pigment dispersion of C.I. Pigment violet 23 is present in a state that the polymer is not sufficiently adsorbed on the surface of the pigment. Incidentally, the present inventors have confirmed that the deposit within the ink flow path and in the vicinity of the ejection opening greatly increases when the (B)/(A) value is less than the borderline of 0.93. The reason for it is inferred to be that the polymer is not sufficiently adsorbed on the surface of the pigment when the (B)/(A) value is less than the borderline of 0.93, so that dispersion breakdown attributable to temperature rise caused by the heat upon ejection rapidly progresses.

Case where the Value of (B)/(A) is Larger than 0.97

A liquid (aqueous ink) containing a pigment dispersion of C.I. Pigment Violet 23 having a (B)/(A) value larger than 0.97 is in a state that the pigment is over-dispersed. More specifically, a finely pulverized pigment is present in plenty in the liquid containing the above-described pigment dispersion. Since the specific surface area of a pigment becomes large as the proportion of the pigment present as particles having a small particle size are large, it may be difficult in some cases to retain a stably dispersed state unless the content of the polymer (dispersant) for dispersing the pigment is increased. However, the content of the polymer in an ink is limited in view of reliability when the ink is provided as an ink jet ink. In addition, since the surface energy of a pigment becomes high as the particle size of the pigment is small, pigment particles are liable to aggregate with each other. Further, it is considered that C.I. Pigment Violet 23, whose hydrophilicity δm is from 21.5 or more to 23.5 or less, is hard to cause adsorption of the polymer because of its high hydrophilic property as described above. From the above-described reasons, the proportion of the polymer, which is expected to function as a dispersant, present in a state adsorbed on the surfaces of the particles of C.I. Pigment Violet 23 becomes low. Thus, even a little environmental change may make it difficult to retain a stably dispersed state in some cases. As a result, it is considered that when an ink containing such a pigment dispersion is ejected by means of a thermal type ink jet recording apparatus, the deposit occurs within the ink flow path and in the vicinity of the ejection opening by the above-described mechanism.

As a result of the investigation by the present inventors, it has been found that the deposit within the ink flow path and in the vicinity of the ejection opening particularly increases when the (B)/(A) value is more than the borderline of 0.97. It is inferred that the reason for this is that since a pigment dispersion which is difficult to retain a stably dispersed state even when a little environmental change occurs is present in plenty when the (B)/(A) value exceeds the borderline of 0.97, dispersion breakdown attributable to temperature rise caused by the heat upon ejection rapidly progresses. In addition, the pigment high in surface energy is easier to cause deposit on various portions within a flow path from an ink cartridge storing an ink to a recording head for ejecting the ink. It is considered that adhesion of reaggregates of the pigment around the deposit as a nucleus is markedly accelerated.

It has been found that the (B)/(A) value in a liquid containing a pigment dispersion of C.I. Pigment Violet 23, which is commercially sold for ink jet inks, is more than 0.97 so far as the present inventors have investigated. The reason for this is unknown. However, the present inventors infer the reason as follows. Color developability is more improved as the (B)/(A) value in the liquid containing the pigment dispersion of C.I. Pigment Violet 23 becomes large. On the other hand, such deposit occurred within the ink flow path and in the vicinity of the ejection opening as described above as well as the lowering of ejection characteristics due to such deposit may be said to be problems specifically caused only in the case where an ink is ejected by means of a thermal type ink jet recording apparatus. In other words, it is considered that the C.I. Pigment Violet 23, which is commercially sold for ink jet inks, is taken into no consideration as to ejection characteristics, and the (B)/(A) value is settled to a value more than 0.97 only for improving color developability. Incidentally, even when such commercially available C.I. Pigment Violet 23 is used, an ink containing a pigment dispersion having a (B)/(A) value within the range defined in the present invention can be provided by suitably determining the dispersing conditions as described above.

As described above, the proportion [(B)/(A)] of the absorbance (B) at the maximum absorption wavelength located in the wavelength range of from 550 nm or more to 570 nm or less to the absorbance (A) at the maximum absorption wavelength located in the wavelength range of from 530 nm or more to 540 nm or less greatly participates in the occurrence of the deposit. Further, as described above, the liquid containing the pigment dispersion of C.I. Pigment Violet 23 has a maximum absorption wavelength (absorbance (C)) also in a wavelength range of from 620 nm or more to 630 nm or less in addition to the above-described two ranges. The absorbance proportion among these 3 maximum absorption wavelengths is somewhat regularly varied by changing the dispersing conditions upon the preparation of pigment dispersions. Thus, the present inventors have thought that the absorbance (C) at the maximum absorption wavelength located in the wavelength range of from 620 nm or more to 630 nm or less also more or less affects the color developability and the occurrence of the deposit within the ink flow path and in the vicinity of the ejection opening, and carried out a further investigation. As a result, it has been found that a liquid containing a pigment dispersion satisfying the conditions of the expression (1) and further satisfying the conditions of the following expression (2) can more effectively inhibit the occurrence of the deposit within the ink flow path and in the vicinity of the ejection opening compared with the pigment dispersion satisfying only the conditions of the expression (1).

$$0.39 \leq (C)/(A) \leq 0.41 \quad (2).$$

As a result of the investigation by the present inventors, it has been found that wavelengths, in which the maximum absorption wavelengths giving the above-described respective absorbances (A), (B) and (C) are present, are present in the following respective ranges, whereby the occurrence of the deposit within the ink flow path and in the vicinity of the ejection opening can be particularly effectively inhibited. More specifically, it is favorable that the absorbance (A), absorbance (B) and absorbance (C) are present in a wavelength range of from 533.0 nm or more to 535.0 nm or less, a wavelength range of from 562.0 nm or more to 562.5 nm or less and a wavelength range of from 624.5 nm or more to 625.0 nm or less, respectively. Incidentally, an ink containing a pigment dispersion in which the wavelengths, in which the maximum absorption wavelengths giving the respective absorbances (A), (B) and (C) are present, are present in the above-described respective ranges can be provided by suitably determining the dispersing conditions in the same manner as described above.

(Hydrophilicity δm of Pigment)

The method for calculating out the hydrophilicity δm of a pigment will hereinafter be described. The hydrophilicity δm of a pigment in the present invention is a value calculated out according to the acetone titration method described in "Shikizai (Coloring Materials)" [62 (8), 524-528 (1989)]. Into a beaker containing a stirrer and 50 ml of ion-exchanged water, is added 0.1 g of a pigment, and the contents are stirred gently to the extent that no vortex is formed. Acetone is added dropwise to the beaker under stirring through a burette. The amount of acetone added, which is required until suspending pigment is wetted and sank, is regarded as "A". The hydrophilicity δm of the pigment is calculated out according to the following expression (3). Incidentally, "23.43" and "9.75" in the expression (3) are SP values (solubility parameters) of water and acetone, respectively, which are described in the above literature.

$$\text{Hydrophilicity } \delta m = \{(50[ml] \times 23.43 + A[ml] \times 9.75)/(50[ml] + A[ml])\} \quad (3)$$

Incidentally, even when the hydrophilicity of a pigment in an ink, i.e., a pigment in a state dispersed by a polymer (hereinafter referred to as "pigment dispersion"), is measured, the hydrophilicity can be calculated out according to the same method as described above. In the case of the pigment dispersion, however, it is necessary to conduct the measurement in a state that the polymer adsorbed on the surface of the pigment has been desorbed.

Various methods are present for desorbing the polymer from the pigment. Specifically, the following methods are considered. A method of subjecting the ink containing the pigment dispersion to salting out or coagulation is mentioned. First of all, organic groups contained in the polymer are analyzed according to a method known per se in the art. When the organic groups contained in the polymer include an anionic group, an acid such as hydrochloric acid or sulfuric acid is added to the ink. When the organic groups include a cationic group, an alkali such as sodium hydroxide is added. In such a manner, the pigment and polymer in the ink can be precipitated by salting out. Alternatively, an alcohol is added in excess to the ink, whereby the pigment and polymer in the ink can be precipitated by coagulation. Further, as a method for precipitating the pigment in the ink, the pigment can be effectively taken out by a combination of salting out and coagulation, or centrifugation.

The precipitate containing the pigment obtained in such a manner is taken out by filtration, solids are sufficiently washed with pure water, and the solids containing the pigment are dried for about one night in an oven of 60° C. The thus-obtained dry solids containing the pigment are washed with a good medium (a water-soluble organic solvent capable of easily dissolving the polymer) for the polymer adsorbed on the pigment. Incidentally, it is necessary to select the good medium according to the kind of the polymer. For example, tetrahydrofuran and chloroform may be used. After the operation for washing the dry solids containing the pigment with the good medium is conducted repeatedly about 3 times, the washed solids are dried for about 3 hours under conditions of a degree of vacuum of several hundreds Pa or less and a temperature of 60° C. for removing remaining water and water-soluble organic solvent. Only the pigment can be taken out of the ink by such a method.

<Aqueous Ink>

First of all, the first ink according to the present invention is characterized by including a pigment, whose hydrophilicity δm falls within a range of from 21.5 or more to 23.5 or less. According to the above-described first method, it is further necessary to settle the content (mass %) of a water-soluble organic solvent in the ink to from 5.0 mass % or more to 17.5 mass % or less with respect to the whole mass of the aqueous ink. According to the above-described second method, it is necessary that when C.I. Pigment Violet 23 is used as a pigment having a hydrophilicity δm of from 21.5 or more to 23.5 or less, a pigment having a specific absorption wavelength is used as the pigment by adjusting, for example, the dispersing state of the pigment. The inks according to the present invention may have the same constitution as in a conventional pigment ink except for the above-described features. The respective components making up the first and second inks according to the present invention will hereinafter be described.

(Pigment)

Pigments having a hydrophilicity δm within a range of from 21.5 or more to 23.5 or less used in the inks according to the present invention specifically include the following commercially available pigments. Examples thereof include Novoperm Yellow H2G (product of Clariant Co.), B8700 (product of Ciba Speciality Chemicals Co.), Hostaperm Violet RL SP (product of Clariant Co.) and Monarch 880 (product of CABOT Co.). When the pigments usable in the present invention are indicated by C.I. numbers, Novoperm Yellow H2G is C.I. Pigment Yellow 120, and Hostaperm Violet RL SP is C.I. Pigment Violet 23. In the first ink according to the present invention, any of pigments mentioned below may be used, not limited to the above-mentioned pigments, so far as the hydrophilicity δm of the pigment falls within a range of from 21.5 or more to 23.5 or less. In the first and second ink according to the present invention, the following pigment can be used in combination with the above-specified pigment.

Carbon Black

As carbon black, may be used any of carbon black pigments such as furnace black, lamp black, acetylene black and channel black. Specifically, the following commercially available products may be used.

Raven: 7000, 5750, 5250, 5000 ULTRA, 3500, 2000, 1500, 1250, 1190 ULTRA-II, 1170 and 1255 (all, products of Columbian Carbon Co.); Black Pearls L, Regal: 400R, 330R and 660R, Mogul L, Monarch: 700, 800, 880, 900, 1000, 1100, 1300, 1400 and 2000, and Valcan XC-72R (all, products of CABOT Co.); Color Black: FW1, FW2, FW2V, FW18, FW200, S150, S160 and S170, Printex: 35, U, V, 140U and 140V, and Special Black: 6, 5, 4A and 4 (all, products of Degussa Co.); and No. 25, No. 33, No. 40, No. 47, No. 52, No. 900, No. 2300, MCF-88, MA600, MA7, MA8 and MA100 (all, products of MITSUBISHI CHEMICAL CORPORATION).

Carbon black newly prepared for the present invention may also be used. Magnetic fine particles such as magnetite and ferrite, and titanium black may also be used as pigments without being limited to carbon black.

Organic Pigments

In addition to carbon black, various kinds of organic pigment may be used. Specifically, the organic pigments include, for example, the following pigments: water-insoluble azo pigments such as Toluidine Red, Toluidine Maroon, Hansa Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; indigo pigments; condensed azo pigments; thioindigo pigments; diketopyrrolopyrrole pigments; Flavanthrone Yellow; Acylamide Yellow; Quinophthalone Yellow; Nickel Azo Yellow; Copper Azomethine Yellow; Perinone Orange; Anthrone Orange; Dianthraquinonyl Red; and Dioxazine Violet. The present invention is not limited thereto.

When organic pigments usable in the present invention are indicated by C.I. numbers, for example, the following pigments may be mentioned: C.I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180 and 185; C.I. Pigment Orange: 16, 36, 43, 51, 55, 59, 61 and 71; C.I. Pigment Red: 9, 48, 49, 52, 53, 57, 97, 122, 123, 149, 168, 175, 176, 177, 180, 184, 192, 215, 216, 217, 220, 223, 224, 226, 227, 228, 238, 240, 254 and 272; C.I. Pigment Violet: 19, 23, 29, 30, 37, 40 and 50; C.I. Pigment Blue: 15, 15:1, 15:3, 15:4, 15:6, 22, 60 and 64; C.I. Pigment Green: 7 and 36; and C.I. Pigment Brown 23, 25 and 26.

In the present invention, the content (mass %) of the pigment in the ink is favorably from 0.1 mass % or more to 15.0 mass % or less, further from 1.0 mass % or more to 10.0 mass % or less, particularly from 1.0 mass % or more to 3.0 mass % or less with respect to the whole mass of the ink. If the content of the pigment is less than 0.1 mass %, a sufficient optical density may not be achieved in some cases. If the content exceeds 15.0 mass %, sticking recovery property may be lowered in some cases.

(Dispersing System of Pigment)

As the pigment making up the first and second ink according to the present invention, is used a polymer dispersion pigment, which is dispersed with a dispersant. As the dispersant used for the polymer dispersion pigment, is favorably used a dispersant capable of stably dispersing the pigment in an aqueous medium by an action of a hydrophilic group, particularly, an anionic group. Examples of usable dispersants include styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic acid half ester copolymers, vinylnaphthalene-acrylic acid copolymers, vinylnaphthalene-maleic acid copolymers, styrene-maleic anhydride-maleic acid half ester copolymers, benzyl methacrylate-methacrylic acid copolymers, and salts of these copolymers.

The polymer used as the dispersant is favorably a block polymer. The reason for this is as follows. In the block polymer, a hydrophilic unit and a hydrophobic unit are regularly arranged in its molecular structure. On the other hand, in a random polymer, a hydrophilic unit and a hydrophobic unit are irregularly arranged in its molecular structure. In the block polymer, therefore, the hydrophobic unit which is easily adsorbed on a pigment is somewhat locally present in the structure of the polymer compared with the random polymer. From such a difference in form between the polymers, the block polymer is hard to be desorbed from the pigment compared with the random polymer, and so the occurrence of the deposit within the ink flow path and in the vicinity of the ejection opening can be more effectively reduced. Incidentally, block polymers usable in the present invention include the following polymers: AB block type in which a hydrophobic monomer unit (referred to as block A) and an ionic hydrophilic monomer unit (referred to as block B) are respectively localized, and ABC block type in which a nonionic hydrophilic monomer unit (referred to as block C) is further added. The present invention is not limited thereto.

The weight average molecular weight of the dispersant is favorably from 1,000 or more to 30,000 or less. In the present invention, the weight average molecular weight of the dispersant is particularly favorably from 1,500 or more to 6,000 or less, further from 2,000 or more to 5,000 or less. It is very rare in an ordinary ink jet pigment ink to use a polymer having a weight average molecular weight of from 2,000 or more to 5,000 or less as a dispersant. In the present invention, however, such a polymer having a low weight average molecular weight is particularly favorably used from the following reason. As described above, the pigment whose hydrophilicity δm falls within a range of from 21.5 or more to 23.5 or less has such a nature that a polymer adsorbed on such a pigment is easy to be desorbed. At this time, even if the polymer is desorbed from the pigment, the polymer present in the ink can be relatively easily adsorbed again on a site of the pigment, from which the polymer has been desorbed, because the polymer having a low weight average molecular weight is used. In other words, since the weight average molecular weight of the dispersant is low, the influence of steric hindrance by the polymer already adsorbed is harder to be exerted, and so the above-described re-adsorption of the polymer is easy to occur. As a result, a stably dispersed state can be retained, so that the occurrence of the deposit within the ink flow path and in the vicinity of the ejection opening can be more inhibited. If the weight average molecular weight of the dispersant is too low, however, the dispersed state of the pigment may become unstable, and the occurrence of the deposit within the ink flow path and in the vicinity of the ejection opening may not be inhibited in some cases. Therefore, in the present invention, it is most favorable to use a polymer having a weight average molecular weight of from 2,000 or more to 5,000 or less as the dispersant.

Further, the content of the polymer in the ink (content of the polymer/content of the pigment) is favorably is from 30.0% or more to 90.0% or less based on the content of the pigment in the ink. If the content of the polymer in the ink is less than 30.0% based on the content of the pigment, it may be difficult in some cases to retain the dispersion stability of the pigment over a long period of time. Even if the content of the polymer in the ink is more than 90.0% based on the content of the pigment, the dispersion stability and the effect on the occurrence of the deposit may not be further improved in some cases. Such a too high content may rather form the cause of ejection failure due to viscosity rise of the ink and the adhesion of the polymer to a face surface (surface having an ejection opening for ejecting the ink) upon ejection of the ink from a recording head, and so the reliability may be lowered in some cases.

The content (mass %) of the polymer in the ink is favorably from 0.5 mass % or more to 3.0 mass % or less, further 0.9 mass % or more to 1.8 mass % or less with respect to the whole mass of the ink. When the content of the polymer in the ink falls within the range of from 0.9 mass % or more to 1.8 mass % or less as described above, the lowering of the ejection stability is prevented, and the excellent dispersion stability can be retained over a long period of time.

(Aqueous Medium)

In the ink, an aqueous medium which contains water, or water and any of water-soluble organic solvents is favorably used. In the above-described first method, it is necessary to settle the content (mass %) of the water-soluble organic solvent in the first ink to from 5.0 mass % or more to 17.5 mass % or less with respect to the whole mass of the ink. In the above-described second method, the content (mass %) of the water-soluble organic solvent in the second ink is favorably from 3.0 mass % or more to 50.0 mass % or less, further from 4.0 mass % or more to 20.0 mass % or less, particularly from 5.0 mass % or more to 17.5 mass % or less.

Examples of usable water-soluble organic solvents include alkanols having 1 to 4 carbon atoms, such as ethanol, isopropanol, n-butanol, isobutanol, sec-butanol and tert-butanol; carboxylic acid amides such as N,N-dimethylformamide and N,N-dimethylacetamide; ketones and ketone alcohols such as acetone, methyl ethyl ketone and 2-methyl-2-hydroxypentan-4-on; cyclic ethers such as tetrahydrofuran and dioxane; glycerol; glycols such as ethylene glycol, diethylene glycol, triethylene glycol, tetraethylene glycol, 1,2- or 1,3-propylene glycol, 1,2- or 1,4-butylene glycol, polyethylene glycol and thiodiglycol; polyhydric alcohols such as 1,3-butanediol, 1,5-pentanediol, 1,2-hexanediol, 1,6-hexanediol, 2-methyl-1,3-propanediol and 1,2,6-hexanetriol; alkyl ethers of polyhydric alcohols, such as ethylene glycol monomethyl (or monoethyl) ether, diethylene glycol monomethyl (or monoethyl) ether and triethylene glycol monoethyl (or monobutyl) ether; heterocyclic compounds such as 2-pyrrolidone, N-methyl-2-pyrrolidone, 1,3-dimethyl-2-imidazolidinone and N-methylmorpholine; and sulfur-containing compounds such as dimethyl sulfoxide. These water-soluble organic solvents may be used either singly or in any combination thereof.

In the present invention, among the above-mentioned water-soluble organic solvents, glycerol, ethylene glycol, diethylene glycol, polyethylene glycol and 2-pyrrolidone are particularly favorably used. When the above-described polymer having the weight average molecular weight of from 1,500 or more to 6,000 or less, further from 2,000 or more to 5,000 or less is used as the dispersant for the pigment, polyethylene glycol having an average molecular weight of 1,000 or more is particularly favorably used as the water-soluble organic solvent. An ink containing the polymer having the above-described weight average molecular weight and polyethylene glycol having an average molecular weight of 1,000 or more is particularly improved in ejection stability when ejection is continuously conducted for a long period of time. Incidentally, the upper limit of polyethylene glycol is favorably 1,500 or less.

As the water, it is desirable to use deionized water. The content (mass %) of water in the ink is favorably from 50.0 mass % or more to 95.0 mass % or less, further from 78.5 mass % or more to 91.0 mass % or less with respect to the whole mass of the ink. In the above-described first method, the content (mass %) of water in the first ink is particularly favorably from 78.5 mass % or more to 91.0 mass % or less. When the content of water is 78.5 mass % or more, the content of water in the ink is relatively large, and the content of other components than water, such as the water-soluble organic solvent and surfactant, is relatively small. As a result, the action of weakening the adsorbability between the pigment and the polymer can be inhibited by the components such as the water-soluble organic solvent and surfactant to more effectively inhibit the occurrence of the deposit.

(Other Additives)

The ink according to the present invention may further contain various kinds of additives in addition to the above-described components as needed. For example, solid humectants such as urea and urea derivatives, trimethylolethane, and trimethylolpropane may be used. In addition, surfactants, antifoaming agents, preservatives and mildewproofing agents may be used in order to provide an ink having desired physical properties. When an in containing a surfactant having a high orientation rate to the pigment is prepared, however, the surfactant is easy to be selectively oriented to a site from which the polymer has been desorbed. As a result, a stably dispersed state cannot be achieved, and so the ejection stability may be lowered in some cases. When a surfactant is used in the present invention, it is favorable to select and use such a surfactant that the critical micelle concentration of an aqueous solution containing only the surfactant amounts to 28 dyne/cm or more for the purpose of achieving good ejection stability. At this time, the content (mass %) of such a surfactant in the ink is favorably from 0.7 mass % or more to 1.0 mass % or less with respect to the whole mass of the ink.

<Ink Jet Recording Method>

The first and second inks according to the present invention are particularly favorably used in an ink jet recording method that an ink is ejected by an ink jet recording system to conduct recording on a recording medium. Examples of the ink jet recording method include a method in which mechanical energy is applied to an ink to eject the ink, and a method in which thermal energy is applied to an ink to eject the ink. The first and second inks according to the present invention can achieve marked effects when the inks are used in the ink jet recording method utilizing thermal energy.

<Ink Cartridge>

The ink cartridge according to the present invention includes an ink storage portion storing the first or second ink according to the present invention.

<Recording Unit>

The recording unit according to the present invention includes an ink storage portion storing the first or second ink according to the present invention and a recording head for ejecting the ink. When the recording unit has a recording head from which the ink is ejected by applying thermal energy to the ink, a marked effect can be achieved.

<Ink Jet Recording Apparatus>

The ink jet recording apparatus according to the present invention includes an ink storage portion storing the first or second ink according to the present invention and a recording head for ejecting the ink. When the ink jet recording apparatus has a recording head from which the ink is ejected by applying thermal energy to the ink, a marked effect can be achieved.

The schematic construction of a mechanism part of the ink jet recording apparatus will hereinafter be described. The ink jet recording apparatus is constructed by a paper feeding part, a conveying part, a carriage part, a paper discharging part, a cleaning part and an outer facing part for protecting these parts and imparting designing ability from the roles of the respective mechanisms. Outlines of these parts will hereinafter be described.

Figure 2:
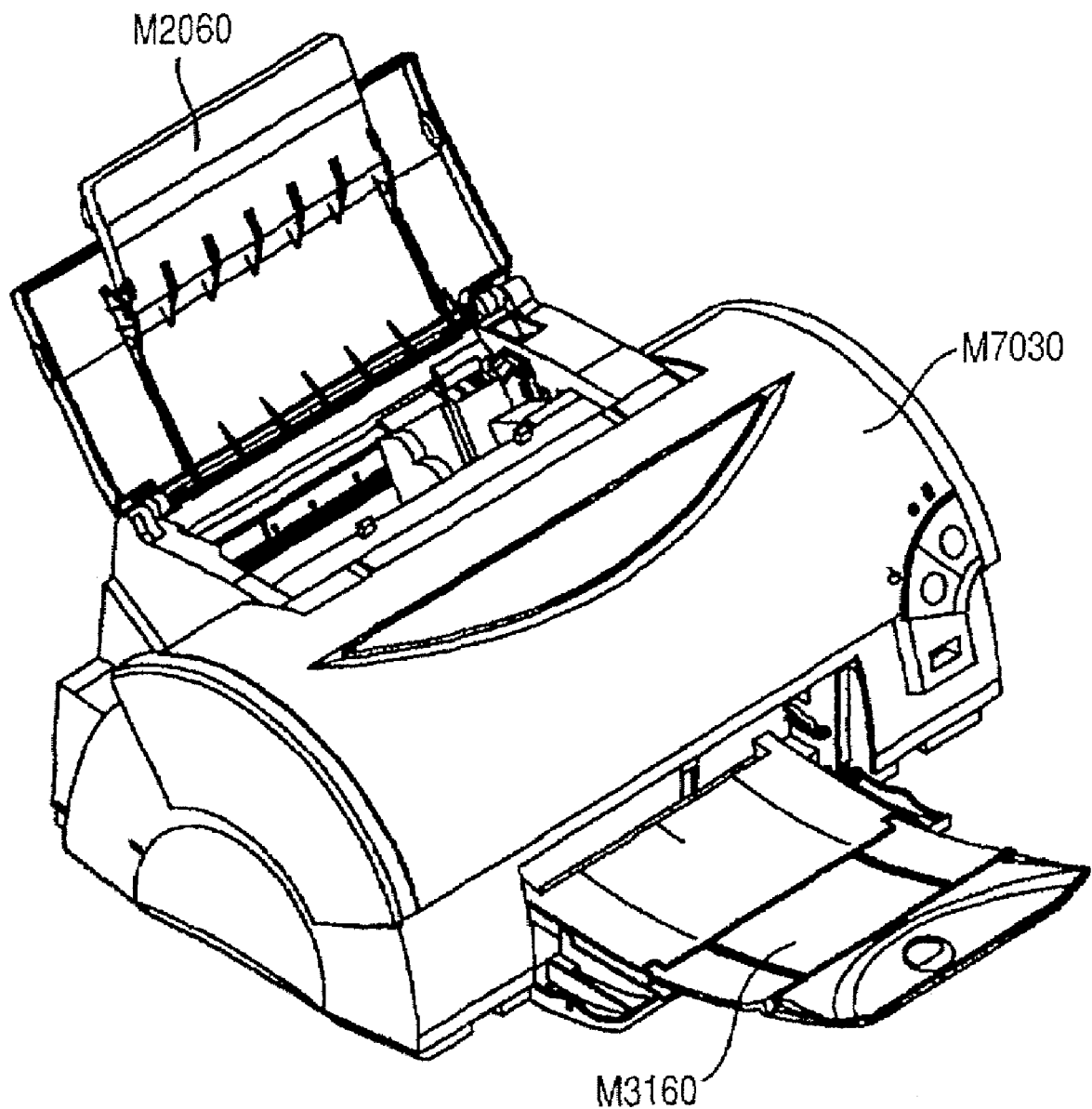
FIG. 2 is a perspective view of an ink jet recording apparatus.
Figure 3:
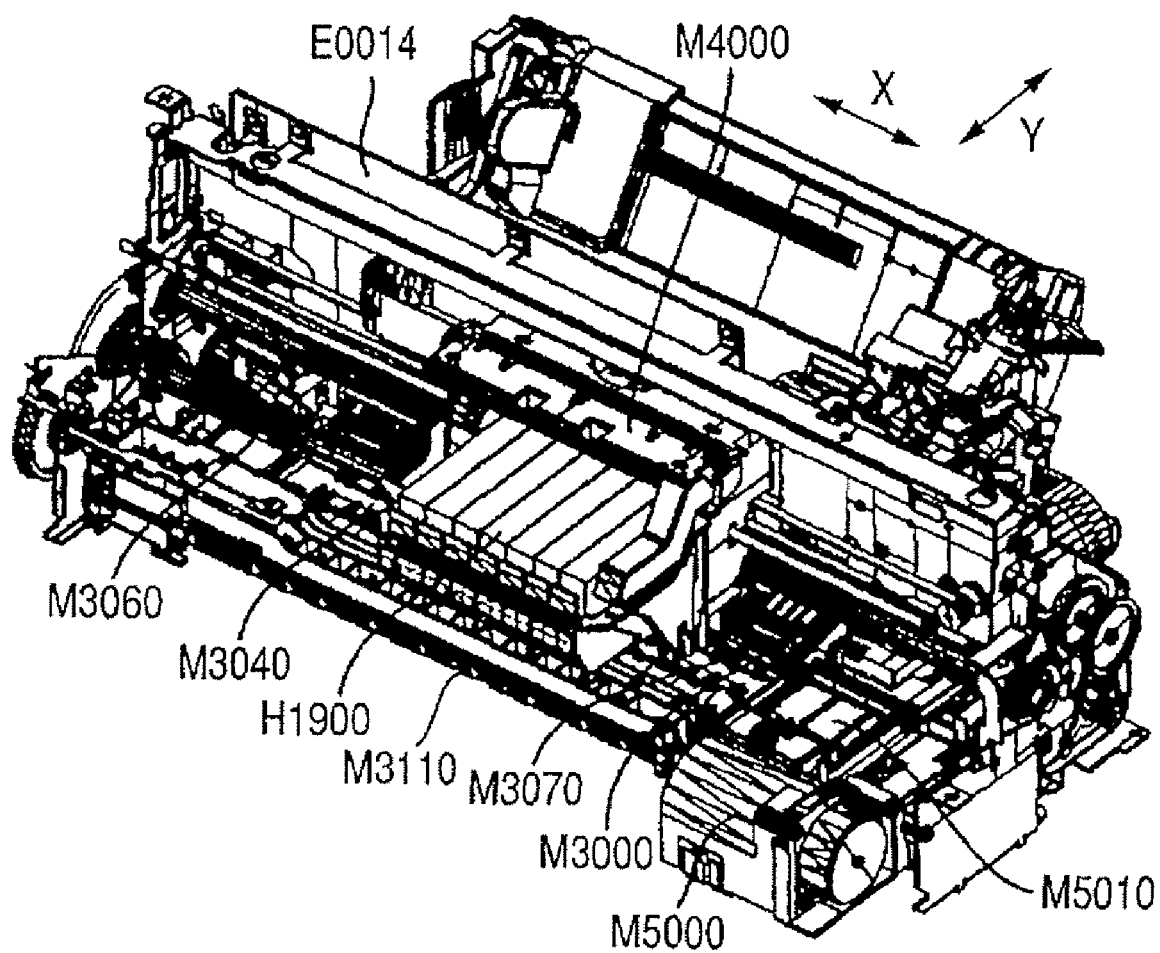
FIG. 3 is a perspective view of a mechanism part of the ink jet recording apparatus.
Figure 4:
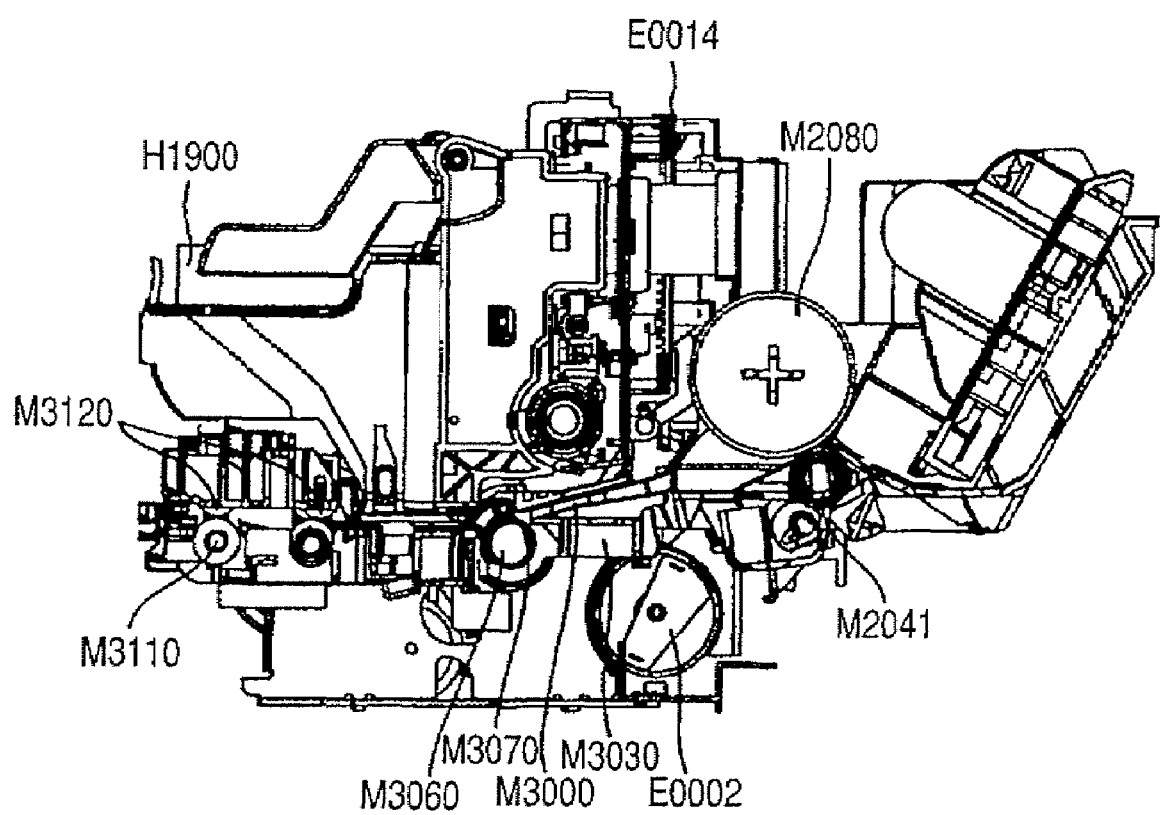
FIG. 4 is a sectional view of the ink jet recording apparatus.

FIG. 2 is a perspective view of the ink jet recording apparatus. FIGS. 3 and 4 are drawings illustrating the internal mechanism of the ink jet recording apparatus, in which FIG. 3 is a perspective view as viewed from the top right-hand, and FIG. 4 is a sectional side elevation of the ink jet recording apparatus.

Upon feeding of paper, a predetermined number of recording media in a paper feeding tray M2060 are sent to a nip part constructed by a paper feed roller M2080 and a separating roller M2041 (see FIGS. 3 and 4). The recording media are separated in the nip part, and only a recording medium located uppermost is conveyed. The recording medium sent to the conveying part is guided to a pinch roller holder M3000 and a paper guide flapper M3030 and sent to a pair of rollers of a conveying roller M3060 and a pinch roller M3070. The pair of rollers having the conveying roller M3060 and the pinch roller M3070 are rotated by driving of an LF motor E0002, and the recording medium is conveyed on a platen M3040 by this rotation (see FIGS. 3 and 4).

Upon forming of an image, a recording head H1001 (see FIG. 5) is arranged at an intended image forming position in the carriage part, and an ink is ejected on the recording medium according to a signal from an electric substrate E0014 (see FIG. 3). The detailed construction of the recording head H1001 will be described subsequently. While conducting recording by the recording head H1001, main scanning with which a carriage M4000 (see FIG. 3) scans in a row direction and secondary scanning with which the conveying roller M3060 (see FIGS. 3 and 4) conveys the recording medium in a line direction are alternately repeated, thereby forming an image on the recording medium.

Lastly, the recording medium is nipped and conveyed between a first paper discharging roller M3110 and a spur M3120 in the paper discharging part (see FIG. 4) and discharged on a paper discharging tray M3160 (see FIG. 2).

In the cleaning part, the recording head H1001 is cleaned. In the cleaning part, a pump M5000 (see FIG. 3) is operated in a state that a cap M5010 (see FIG. 3) has been brought into close contact with ejection orifices of the recording head H1001, whereby the ink is sucked from the recording head H1001. When the ink remaining in the cap M5010 is sucked in a state that the cap has been opened, sticking of the ink and other problems are prevented.

(Construction of Recording Head)

The construction of a head cartridge H1000 will be described (see FIG. 5). The head cartridge H1000 has a recording head H1001, a unit for installing an ink cartridge H1900 and a unit for feeding an ink from the ink cartridge H1900 to the recording head. The head cartridge H1000 is detachably installed on the carriage M4000 (see FIG. 3).

Figure 5:
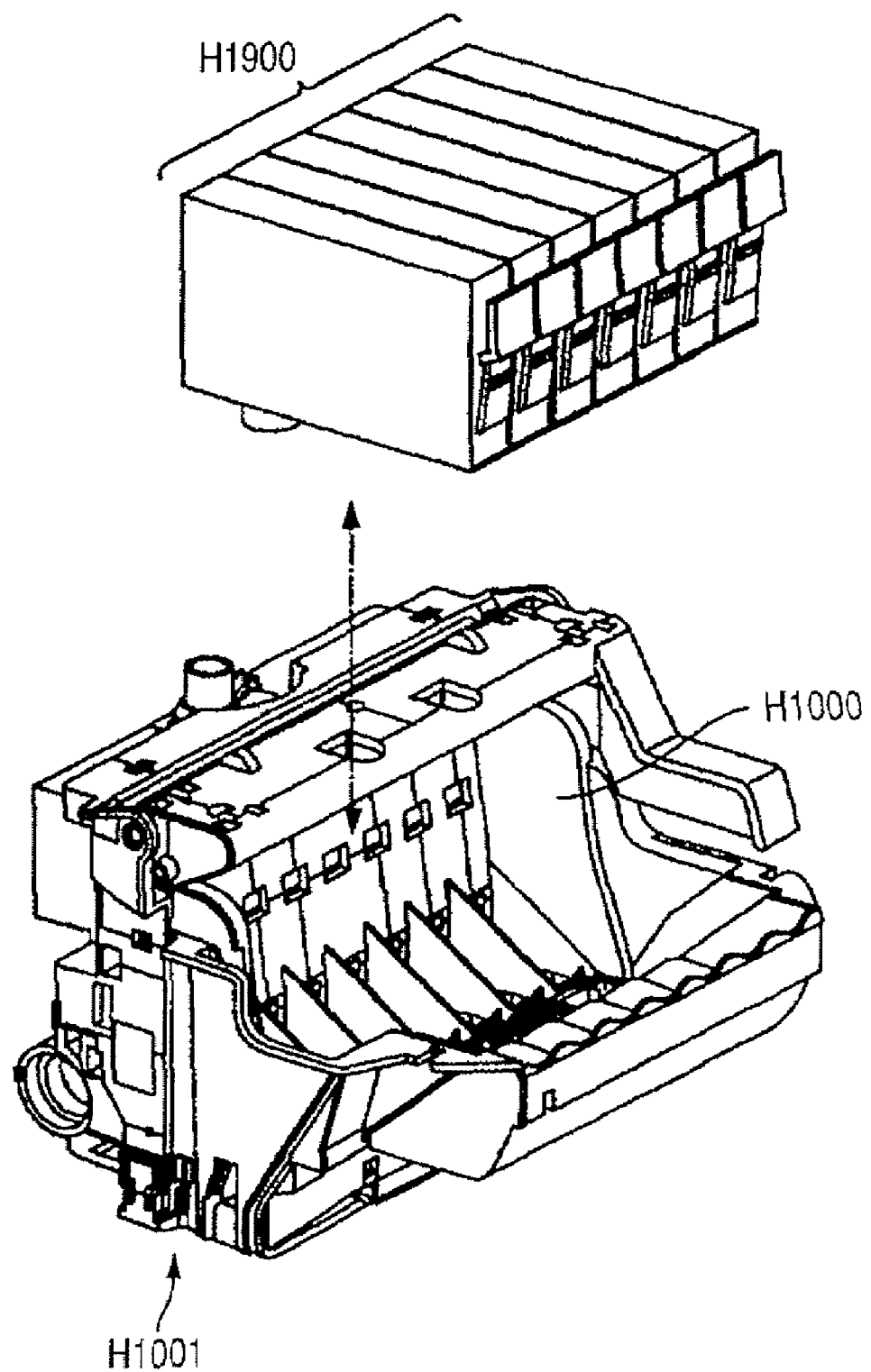
FIG. 5 is a perspective view illustrating a state that an ink cartridge is installed in a head cartridge.

FIG. 5 illustrates a state that the ink cartridge H1900 is installed in the head cartridge H1000. The ink jet recording apparatus forms an image with, for example, yellow, magenta, cyan, black, red, green and blue inks. Accordingly, ink cartridges H1900 for 7 colors are independently provided. The inks according to the present invention are used as at least one ink of the inks described above. As illustrated in FIG. 5, each ink cartridge is detachably installed in the head cartridge H1000. The ink cartridge H1900 can be detachably installed in a state that the head cartridge H1000 has been installed in the carriage M4000 (see FIG. 3).

Figure 6:
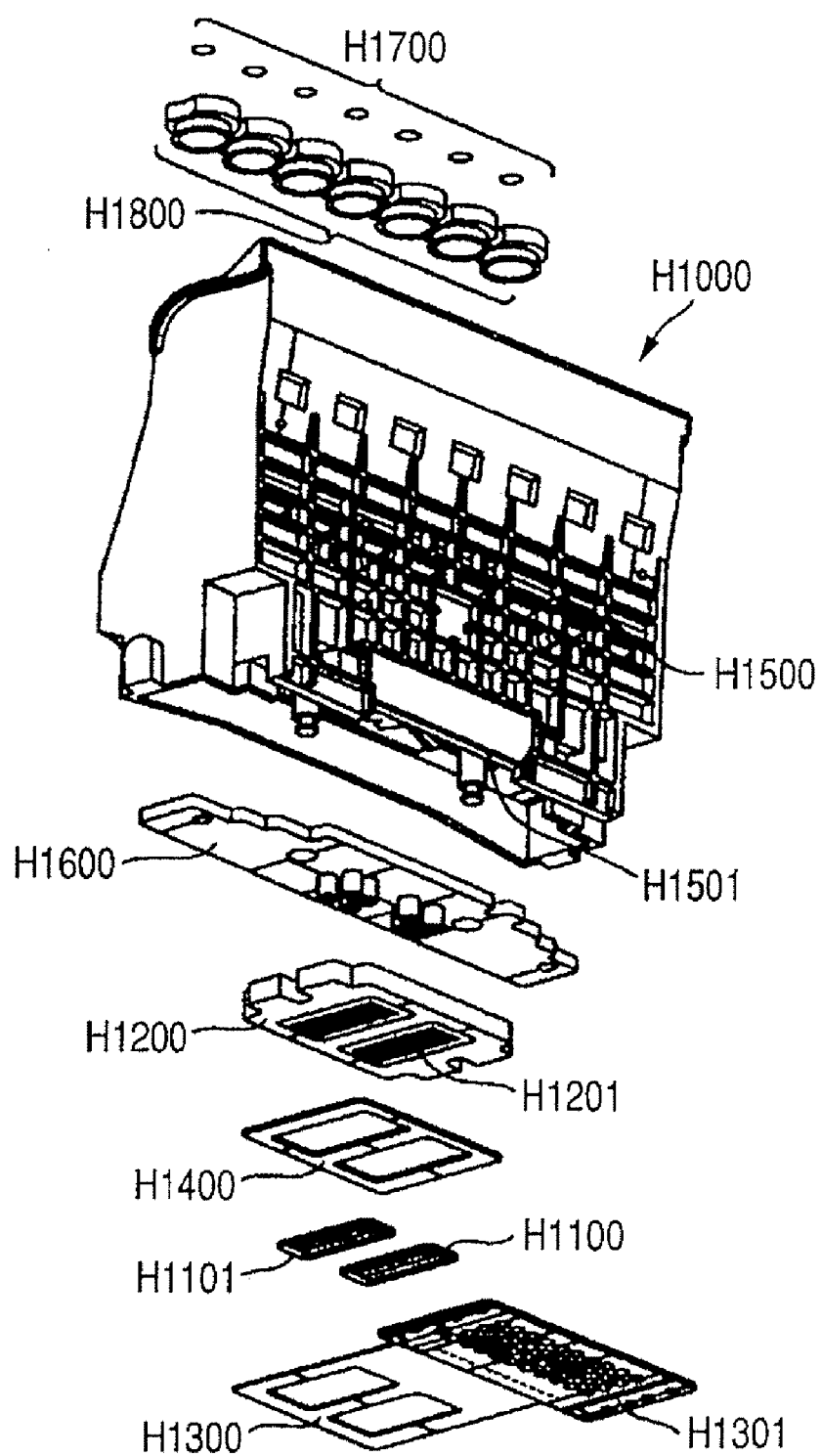
FIG. 6 is an exploded perspective view of the head cartridge.

FIG. 6 is an exploded perspective view of the head cartridge H1000. The head cartridge H1000 is constructed by recording element substrates, plates, an electric wiring substrate H1300, a tank holder H1500, a flow path forming member H1600, filters H1700 and seal rubber H1800. The recording element substrates include a first recording element substrate H1100 and a second recording element substrate H1101, and the plates include a first plate H1200 and a second plate H1400.

The first recording element substrate H1100 and the second recording element substrate H1101 are Si substrates, and a plurality of recording elements (nozzles) for ejecting an ink is formed in one surfaces thereof by a photolithographic technique. An electric wiring of Al for supplying electric power to each recording element is formed by a film forming technique. A plurality of ink flow paths corresponding to the individual recording elements is also formed by the photolithographic technique. Ink supply openings for supplying inks to a plurality of the ink flow paths are formed so as to open to a back surface.

Figure 7:
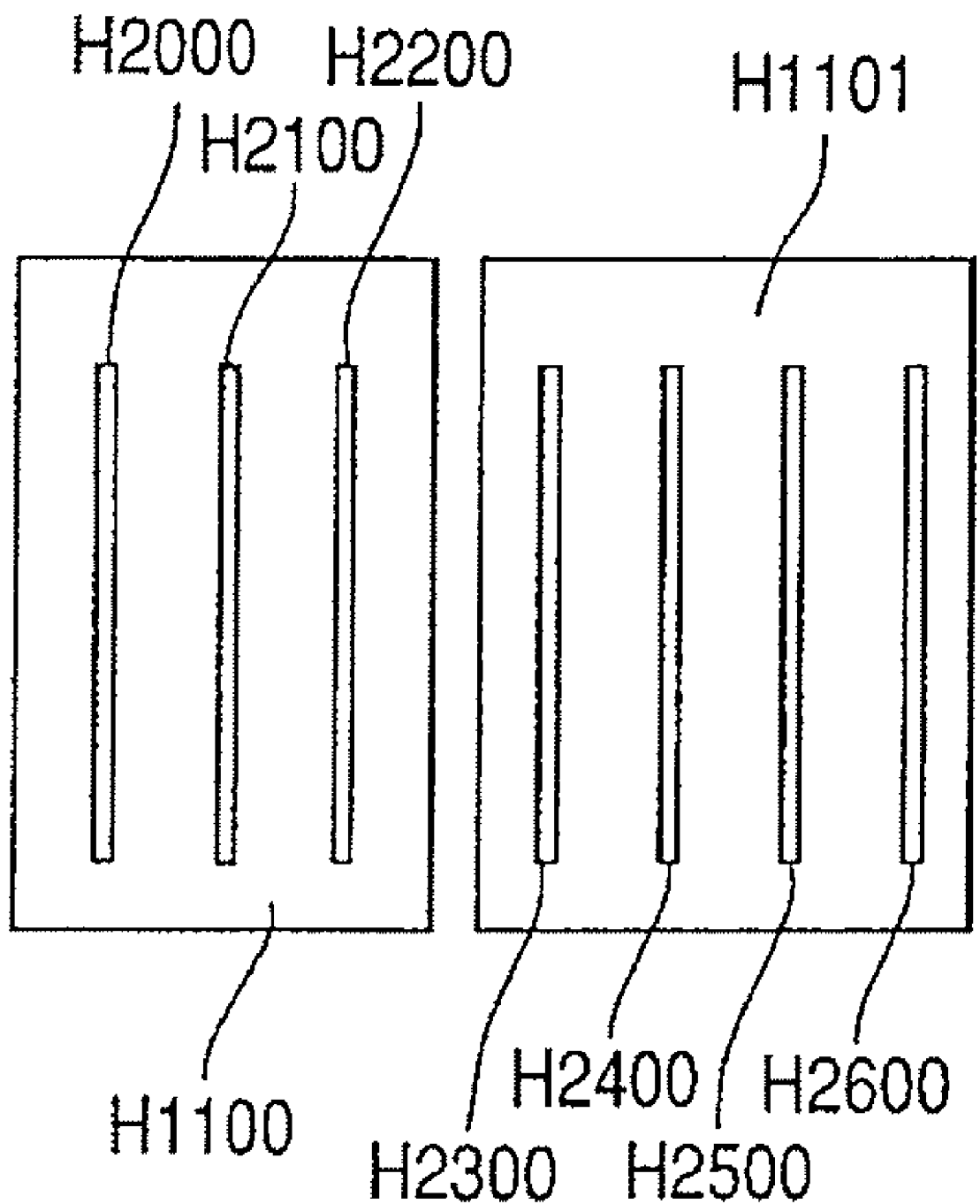
FIG. 7 is an elevational view illustrating recording element substrates in the head cartridge.

FIG. 7 is an enlarged elevational view illustrating the constructions of the first recording element substrate H1100 and the second recording element substrate H1101. Rows H2000 to H2600 (hereinafter also referred to as nozzle rows) of recording elements for respectively supplying different inks are formed in the substrates. In the first recording element substrate H1100, are formed nozzle rows for 3 colors of a nozzle row H2000 for the yellow ink, a nozzle row H2100 for the magenta ink and a nozzle row H2200 for the cyan ink. In the second recording element substrate H1101, are formed nozzle rows for 4 colors of a nozzle row H2300 for the red ink, a nozzle row H2400 for the black ink, a nozzle row H2500 for the green ink and a nozzle row H2600 for the blue ink.

Each nozzle row has 768 nozzles arranged at intervals of 1,200 dpi (dots/inch; referential value) and ejects about 2 picoliters of an ink. The opening area in each ejection orifice is preset to about 100 $\mu m^2$.

Description is given with reference to FIGS. 5 and 6. The first recording element substrate H1100 and second recording element substrate H1101 are bonded and fixed to the first plate H1200. In the first plate, are formed ink supply openings H1201 for supplying inks to the first recording element substrate H1100 and second recording element substrate H1101. Further, the second plate H1400 having openings is bonded and fixed to the first plate H1200. This second plate H1400 holds the electric wiring substrate H1300 so as to electrically connect the electric wiring substrate H1300 to the first recording element substrate H1100 and second recording element substrate H1101.

The electric wiring substrate H1300 applies electric signals for ejecting an ink from each nozzle formed in the first recording element substrate H1100 and second recording element substrate H1101. The electric wiring substrate H1300 has electric wirings corresponding to the first recording element substrate H1100 and second recording element substrate H1101, and an external signal input terminal H1301 located at the end of the electric wirings for receiving electric signals from the ink jet recording apparatus. The external signal input terminal H1301 is positioned and fixed on the back surface side of the tank holder H1500.

The flow path forming member H1600 is fixed to the tank holder H1500 for holding the ink cartridges H1900 by, for example, ultrasonic welding to form ink flow paths H1501 linking from the ink cartridges H1900 to the first plate H1200. The filters H1700 are provided at ends on the ink cartridge side of the ink flow paths H1501 linking to the ink cartridges H1900 so as to prevent invasion of dust from the outside. Sealing rubber H1800 is fitted to portions engaged with the ink cartridges H1900 so as to prevent evaporation of the inks from the engaged portions.

A tank holder part is bonded to a recording head part H1001 by, for example, adhesion, thereby forming the head cartridge H1000. The tank holder part includes the tank holder H1500, the flow path forming member H1600, the filters H1700 and the sealing rubber H1800. The recording head part H1001 includes the first recording element substrate H1100, the second recording element substrate H1101, the first plate H1200, the electric wiring substrate H1300 and the second plate H1400.

The recording head of the thermal ink jet system that recording is conducted using electrothermal converters (recording elements), which generate thermal energy for causing an ink to cause film boiling corresponding to an electric signal, has been described as an embodiment of the recording head herein. Typical construction and principles thereof are those which perform recording by using fundamental principles as disclosed in, for example, U.S. Pat. Nos. 4,723,129 and 4,740,796. This system is applicable to any of the so-called On-Demand type and continuous type.

In particular, the thermal ink jet system is effectively applied to the On-Demand type. In the case of the On-Demand type, at least one driving signal, which corresponds to recording information and gives a rapid temperature rise exceeding nuclear boiling, is applied to an electrothermal converter arranged corresponding to a liquid flow path, in which an ink is retained, thereby causing the electrothermal converter to generate thermal energy to cause film boiling in the ink. As a result, a bubble can be formed in the ink in response to the driving signal in relation of one to one. The ink is ejected through an ejection opening by the growth-contraction of this bubble to form at least one droplet. When the driving signal is applied in the form of a pulse, the growth-contraction of the bubble is suitably conducted in a moment, so that the ejection of the ink excellent in responsiveness in particular can be achieved. It is therefore favorable to use such pulsed signals.

The inks according to the present invention may also be favorably used in an ink jet recording apparatus utilizing mechanical energy as will be described below, not limited to the thermal ink jet system. The ink jet recording apparatus of this system includes a nozzle-forming substrate having a plurality of nozzles, pressure-generating elements having a piezoelectric material and an electrically conductive material provided in an opposing relation to the nozzles, and an ink filled around the pressure-generating elements, in which the pressure-generating elements are displaced by voltage applied to eject the ink from the nozzles.

The ink jet recording apparatus are not limited to the apparatus as described above in which the head and the ink cartridge are separately provided. Therefore, a device in which these members are integrally formed may also be used. The ink cartridge may be separably or unseparably installed integrally in a recording head and mounted on a carriage, or may be provided at a fixing site of an ink jet recording apparatus to supply an ink to a recording head through an ink supply member such as a tube. When a mechanism for applying a favorable negative pressure to a recording head is provided in an ink cartridge, the following arrangements may favorably be adopted. More specifically, examples thereof include an arrangement in which an absorbing member is arranged in an ink storage portion of the ink cartridge, and an arrangement having a flexible ink-storing bag and a spring part for applying biasing force to the bag in a direction expanding the internal volume of the bag. The ink jet recording apparatus may adopt a recording system of such serial type as described above, or a line printer type that recording elements are arranged over a range corresponding to the overall width of a recording medium.

EXAMPLES

The present invention will hereinafter be described more specifically by the following Examples and Comparative Examples. However, the present invention is not limited to these examples so far as the subject matter of the present invention is not overstepped. Incidentally, "part" or "parts" and "%" as will be used below are based on mass unless expressly noted.

<Preparation of Pigment Dispersions>

Respective pigment dispersions were prepared according to the following procedure and composition. In Table 1, are shown the acid value and weight average molecular weight of a polymer used in preparation of each pigment dispersion, the kind (block polymer or random polymer) of the polymer, the dispersing conditions (dispersing time and peripheral speed) upon the preparation of the pigment dispersions, and the contents [%] of a pigment and a polymer in each pigment dispersion.

Incidentally, the pigments used in the preparation of Pigment Dispersions 1 to 18 are all C.I. Pigment Violet 23 (trade name: Hostaperm Violet RL SP; product of Clariant Co.). The hydrophilicity δm of this pigment was measured in the following manner. Into a beaker containing a stirrer and 50 ml of ion-exchanged water, was added 0.1 g of the pigment, and the contents were stirred gently to the extent that no vortex was formed. Acetone was added dropwise to the beaker under stirring through a burette. The amount A of acetone added, which was required until suspending pigment was wetted and sank, was 6.3 [mL]. The hydrophilicity δm of the pigment was calculated out according to the following expression (3) and was found to be 21.9. Incidentally, "23.43" and "9.75" in the expression (3) are SP values (solubility parameters) of water and acetone, respectively.

Hydrophilicity δm={(50[ml]×23.43+$A$[ml]×9.75)/(50[ml]+$A$[ml])}  (3)

(Preparation of Pigment Dispersion 1)

10 parts of the pigment, 9 parts of a dispersant and 81 parts of ion-exchanged water were mixed to prepare a liquid pigment dispersion 1. As the dispersant, was used Polymer A obtained by neutralizing with an aqueous solution of potassium hydroxide an AB type block polymer (acid value: 250, weight average molecular weight: 6,000) synthesized according to a method known per se in the art by using benzyl methacrylate and methacrylic acid as raw materials. This liquid pigment dispersion 1 was charged into a recirculating bead mill, and 85 parts of zirconia beads having a diameter of 0.3 mm were put therein to conduct dispersion. At this time, the dispersing time and peripheral speed were controlled to respective values shown in Table 1 to prepare Pigment Dispersion 1. The resultant dispersion was then centrifuged to remove coarse particles. The thus-treated dispersion was filtered under pressure through a microfilter (product of Fuji Photo Film Co., Ltd.) having a pore size of 3.0 μm to prepare Pigment Dispersion 1 having a solid pigment content of 10 mass % and a polymer content of 9 mass %.

(Preparation of Pigment Dispersion 2)

Pigment Dispersion 2 having a solid pigment content of 10 mass % and a polymer content of 9 mass % was prepared in the same manner as in Pigment Dispersion 1 except that the dispersing time and peripheral speed were changed to respective values shown in Table 1.

(Preparation of Pigment Dispersion 3)

Pigment Dispersion 3 having a solid pigment content of 10 mass % and a polymer content of 9 mass % was prepared in the same manner as in Pigment Dispersion 1 except that the dispersing time and peripheral speed were changed to respective values shown in Table 1.

(Preparation of Pigment Dispersion 4)

Pigment Dispersion 4 having a solid pigment content of 10 mass % and a polymer content of 9 mass % was prepared in the same manner as in Pigment Dispersion 1 except that the dispersing time and peripheral speed were changed to respective values shown in Table 1.

(Preparation of Pigment Dispersion 5)

10 parts of the pigment, 9 parts of a dispersant and 81 parts of ion-exchanged water were mixed to prepare a liquid pigment dispersion 2. As the dispersant, was used Polymer B obtained by neutralizing with an aqueous solution of potassium hydroxide an AB type block polymer (acid value: 250, weight average molecular weight: 1,500) synthesized according to a method known per se in the art by using benzyl methacrylate and methacrylic acid as raw materials. Pigment Dispersion 5 having a solid pigment content of 10 mass % and a polymer content of 9 mass % was prepared in the same manner as in Pigment Dispersion 1 except that the liquid pigment dispersion 2 was used in place of the liquid pigment dispersion 1, and the dispersing time and peripheral speed were changed to respective values shown in Table 1.

(Preparation of Pigment Dispersion 6)

10 parts of the pigment, 9 parts of a dispersant and 81 parts of ion-exchanged water were mixed to prepare a liquid pigment dispersion 3. As the dispersant, was used Polymer C obtained by neutralizing with an aqueous solution of potassium hydroxide an AB type block polymer (acid value: 250, weight average molecular weight: 2,000) synthesized according to a method known per se in the art by using benzyl methacrylate and methacrylic acid as raw materials. Pigment Dispersion 6 having a solid pigment content of 10 mass % and a polymer content of 9 mass % was prepared in the same manner as in Pigment Dispersion 1 except that the liquid pigment dispersion 3 was used in place of the liquid pigment dispersion 1, and the dispersing time and peripheral speed were changed to respective values shown in Table 1.

(Preparation of Pigment Dispersion 7)

10 parts of the pigment, 9 parts of a dispersant and 81 parts of ion-exchanged water were mixed to prepare a liquid pigment dispersion 4. As the dispersant, was used Polymer D obtained by neutralizing with an aqueous solution of potassium hydroxide an AB type block polymer (acid value: 250, weight average molecular weight: 5,000) synthesized according to a method known per se in the art by using benzyl methacrylate and methacrylic acid as raw materials. Pigment Dispersion 7 having a solid pigment content of 10 mass % and a polymer content of 9 mass % was prepared in the same manner as in Pigment Dispersion 1 except that the liquid pigment dispersion 4 was used in place of the liquid pigment dispersion 1, and the dispersing time and peripheral speed were changed to respective values shown in Table 1.

(Preparation of Pigment Dispersion 8)

Pigment Dispersion 8 having a solid pigment content of 10 mass % and a polymer content of 9 mass % was prepared in the same manner as in Pigment Dispersion 1 except that the dispersing time and peripheral speed were changed to respective values shown in Table 1.

(Preparation of Pigment Dispersion 9)

Pigment Dispersion 9 having a solid pigment content of 10 mass % and a polymer content of 9 mass % was prepared in the same manner as in Pigment Dispersion 1 except that the dispersing time and peripheral speed were changed to respective values shown in Table 1.

(Preparation of Pigment Dispersion 10)

Pigment Dispersion 10 having a solid pigment content of 10 mass % and a polymer content of 9 mass % was prepared in the same manner as in Pigment Dispersion 1 except that the dispersing time and peripheral speed were changed to respective values shown in Table 1.

(Preparation of Pigment Dispersion 11)

Pigment Dispersion 11 having a solid pigment content of 10 mass % and a polymer content of 9 mass % was prepared in the same manner as in Pigment Dispersion 1 except that the dispersing time and peripheral speed were changed to respective values shown in Table 1.

(Preparation of Pigment Dispersion 12)

Pigment Dispersion 12 having a solid pigment content of 10 mass % and a polymer content of 9 mass % was prepared in the same manner as in Pigment Dispersion 1 except that the liquid pigment dispersion 4 was used in place of the liquid pigment dispersion 1, and the dispersing time and peripheral speed were changed to respective values shown in Table 1.

(Preparation of Pigment Dispersion 13)

10 parts of the pigment, 9 parts of a dispersant and 81 parts of ion-exchanged water were mixed to prepare a liquid pigment dispersion 5. As the dispersant, was used Polymer E obtained by neutralizing with an aqueous solution of potassium hydroxide an AB type block polymer (acid value: 250, weight average molecular weight: 2,000) synthesized according to a method known per se in the art by using benzyl methacrylate and methacrylic acid as raw materials. Pigment Dispersion 13 having a solid pigment content of 10 mass % and a polymer content of 9 mass % was prepared in the same manner as in Pigment Dispersion 1 except that the liquid pigment dispersion 5 was used in place of the liquid pigment dispersion 1, and the dispersing time and peripheral speed were changed to respective values shown in Table 1.

(Preparation of Pigment Dispersion 14)

10 parts of the pigment, 9 parts of a dispersant and 81 parts of ion-exchanged water were mixed to prepare a liquid pigment dispersion 6. As the dispersant, was used Polymer F obtained by neutralizing with an aqueous solution of potassium hydroxide an AB type block polymer (acid value: 250, weight average molecular weight: 1,500) synthesized according to a method known per se in the art by using benzyl methacrylate and methacrylic acid as raw materials. Pigment Dispersion 14 having a solid pigment content of 10 mass % and a polymer content of 9 mass % was prepared in the same manner as in Pigment Dispersion 1 except that the liquid pigment dispersion 6 was used in place of the liquid pigment dispersion 1, and the dispersing time and peripheral speed were changed to respective values shown in Table 1.

(Preparation of Pigment Dispersion 15)

10 parts of the pigment, 2 parts of a dispersant and 88 parts of ion-exchanged water were mixed to prepare a liquid pigment dispersion 7. As the dispersant, was used Polymer A. Pigment Dispersion 15 having a solid pigment content of 10 mass % and a polymer content of 2 mass % was prepared in the same manner as in Pigment Dispersion 1 except that the liquid pigment dispersion 7 was used in place of the liquid pigment dispersion 1, and the dispersing time and peripheral speed were changed to respective values shown in Table 1.

(Preparation of Pigment Dispersion 16)

10 parts of the pigment, 2 parts of a dispersant and 88 parts of ion-exchanged water were mixed to prepare a liquid pigment dispersion 8. As the dispersant, was used Polymer D. Pigment Dispersion 16 having a solid pigment content of 10 mass % and a polymer content of 2 mass % was prepared in the same manner as in Pigment Dispersion 1 except that the liquid pigment dispersion 8 was used in place of the liquid pigment dispersion 1, and the dispersing time and peripheral speed were changed to respective values shown in Table 1.

(Preparation of Pigment Dispersion 17)

10 parts of the pigment, 9 parts of a dispersant and 81 parts of ion-exchanged water were mixed to prepare a liquid pigment dispersion 9. As the dispersant, was used Polymer G obtained by neutralizing with an aqueous solution of potassium hydroxide a random polymer (acid value: 250, weight average molecular weight: 6,000) synthesized according to a method known per se in the art by using benzyl methacrylate and methacrylic acid as raw materials. Pigment Dispersion 17 having a solid pigment content of 10 mass % and a polymer content of 9 mass % was prepared in the same manner as in Pigment Dispersion 1 except that the liquid pigment dispersion 9 was used in place of the liquid pigment dispersion 1, and the dispersing time and peripheral speed were changed to respective values shown in Table 1.

(Preparation of Pigment Dispersion 18)

10 parts of the pigment, 9 parts of a dispersant and 81 parts of ion-exchanged water were mixed to prepare a liquid pigment dispersion 10. As the dispersant, was used Polymer H obtained by neutralizing with an aqueous solution of potassium hydroxide a random polymer (acid value: 250, weight average molecular weight: 5,000) synthesized according to a method known per se in the art by using benzyl methacrylate and methacrylic acid as raw materials. Pigment Dispersion 18 having a solid pigment content of 10 mass % and a polymer content of 9 mass % was prepared in the same manner as in Pigment Dispersion 1 except that the liquid pigment dispersion 10 was used in place of the liquid pigment dispersion 1, and the dispersing time and peripheral speed were changed to respective values shown in Table 1.

TABLE 1

Properties of polymers used in pigment dispersions, dispersing conditions and contents of pigment and polymer

|  |  | Acid value of polymer | Weight average molecular weight of polymer | Kind of polymer | Dispersing conditions | | Content of pigment [%] | Content of polymer [%] |
| --- | --- | --- | --- | --- | --- | --- | --- | --- |
|  |  |  |  |  | Dispersing time [hour] | Peripheral speed [m/sec] |  |  |
| Pigment dispersion | 1 | 250 | 6,000 | Block | 5.0 | 4.0 | 10 | 9 |
|  | 2 | 250 | 6,000 | Block | 1.5 | 4.0 | 10 | 9 |
|  | 3 | 250 | 6,000 | Block | 1.0 | 8.0 | 10 | 9 |
|  | 4 | 250 | 6,000 | Block | 3.0 | 4.0 | 10 | 9 |

TABLE 1-continued

Properties of polymers used in pigment dispersions, dispersing conditions and contents of pigment and polymer

|  | Acid value of polymer | Weight average molecular weight of polymer | Kind of polymer | Dispersing conditions | | Content of pigment [%] | Content of polymer [%] |
|---|---|---|---|---|---|---|---|
|  |  |  |  | Dispersing time [hour] | Peripheral speed [m/sec] |  |  |
| 5 | 250 | 1,500 | Block | 3.0 | 4.0 | 10 | 9 |
| 6 | 250 | 2,000 | Block | 3.0 | 4.0 | 10 | 9 |
| 7 | 250 | 5,000 | Block | 3.0 | 4.0 | 10 | 9 |
| 8 | 250 | 6,000 | Block | 1.0 | 4.0 | 10 | 9 |
| 9 | 250 | 6,000 | Block | 0.5 | 4.0 | 10 | 9 |
| 10 | 250 | 6,000 | Block | 3.0 | 8.0 | 10 | 9 |
| 11 | 250 | 6,000 | Block | 5.0 | 8.0 | 10 | 9 |
| 12 | 250 | 5,000 | Block | 1.0 | 4.0 | 10 | 9 |
| 13 | 250 | 2,000 | Block | 1.0 | 4.0 | 10 | 9 |
| 14 | 250 | 1,500 | Block | 1.0 | 4.0 | 10 | 9 |
| 15 | 250 | 6,000 | Block | 1.0 | 4.0 | 10 | 2 |
| 16 | 250 | 5,000 | Block | 3.0 | 4.0 | 10 | 2 |
| 17 | 250 | 6,000 | Random | 1.0 | 4.0 | 10 | 9 |
| 18 | 250 | 5,000 | Random | 3.0 | 4.0 | 10 | 9 |

<First Method>

(Preparation of the First Inks according to the First Method)

After their corresponding respective components shown in Table 2 and Table 3 were mixed and sufficiently stirred, the resultant respective mixtures were filtered under pressure through a microfilter (product of Fuji Photo Film Co., Ltd.) having a pore size of 1.0 μm to prepare Inks 1 to 18. In order to more clarify the constitution of each ink, respective contents of the pigment, polymer, water and water-soluble organic solvent in the ink, the value of (content of polymer/content of pigment), and the value of (content of water-soluble organic solvent/content of pigment) are shown in Table 2 and Table 3 collectively. Herein, the content of the water-soluble organic solvent does not include the content of a surfactant.

TABLE 2

Compositions of Inks 1 to 9 (unit: %)

|  | Ink | | | | | | | | |
|---|---|---|---|---|---|---|---|---|---|
|  | 1 | 2 | 3 | 4 | 5 | 6 | 7 | 8 | 9 |
| Pigment Dispersion 8 | 20.0 |  |  | 20.0 | 20.0 |  |  | 10.0 | 30.0 |
| Pigment Dispersion 10 |  | 20.0 |  |  |  |  |  |  |  |
| Pigment Dispersion 12 |  |  | 20.0 |  |  |  |  |  |  |
| Pigment Dispersion 13 |  |  |  |  |  | 20.0 |  |  |  |
| Pigment Dispersion 14 |  |  |  |  |  |  | 20.0 |  |  |
| Pigment Dispersion 15 |  |  |  |  |  |  |  |  |  |
| Pigment Dispersion 17 |  |  |  |  |  |  |  |  |  |
| Glycerol | 7.0 | 7.0 | 7.0 | 3.0 | 7.0 | 7.0 | 7.0 | 7.0 | 7.0 |
| 2-Pyrrolidone | 5.0 | 5.0 | 5.0 |  | 5.0 | 5.0 | 5.0 | 5.0 | 5.0 |
| Ethylene glycol | 2.0 | 2.0 | 2.0 |  | 2.5 | 2.0 | 2.0 | 2.0 | 2.0 |
| Polyethylene glycol (*1) | 3.0 | 3.0 | 3.0 | 2.0 | 3.0 | 3.0 | 3.0 | 3.0 | 3.0 |
| Acetylenol EH (*2) | 0.7 | 0.7 | 0.7 | 0.7 | 0.7 | 0.7 | 0.7 | 0.7 | 0.7 |
| Polymer A |  |  |  |  |  |  |  |  |  |
| Water | 62.3 | 62.3 | 62.3 | 74.3 | 61.8 | 62.3 | 62.3 | 72.3 | 52.3 |
| Pigment content [mass %] | 2.0 | 2.0 | 2.0 | 2.0 | 2.0 | 2.0 | 2.0 | 1.0 | 3.0 |
| Polymer content [mass %] | 1.8 | 1.8 | 1.8 | 1.8 | 1.8 | 1.8 | 1.8 | 0.9 | 2.7 |
| Water-soluble organic solvent content [mass %] | 17.0 | 17.0 | 17.0 | 5.0 | 17.5 | 17.0 | 17.0 | 17.0 | 17.0 |
| Water content [mass %] | 78.5 | 78.5 | 78.5 | 90.5 | 78.0 | 78.5 | 78.5 | 80.4 | 76.6 |
| Polymer/pigment [%] (*3) | 90.0 | 90.0 | 90.0 | 90.0 | 90.0 | 90.0 | 90.0 | 90.0 | 90.0 |
| Water-soluble organic solvent/pigment (*4) | 8.5 | 8.5 | 8.5 | 2.5 | 8.8 | 8.5 | 8.5 | 17.0 | 5.7 |

(*1) Weight average molecular weight: 1,000
(*2) Acetylene glycol ethylene oxide adduct (surfactant; product of Kawaken Fine Chemicals Co., Ltd.)
(*3) (Content of polymer/content of pigment) [%]
(*4) (Content of water-soluble organic solvent/content of pigment) [times].

TABLE 3

Compositions of Inks 10 to 18 (unit: %)

| | Ink 10 | Ink 11 | Ink 12 | Ink 13 | Ink 14 | Ink 15 | Ink 16 | Ink 17 | Ink 18 |
|---|---|---|---|---|---|---|---|---|---|
| Pigment Dispersion 8 | 35.0 | | | 20.0 | 20.0 | | | 20.0 | 20.0 |
| Pigment Dispersion 10 | | | | | | | | | |
| Pigment Dispersion 12 | | | | | | | 20.0 | | |
| Pigment Dispersion 13 | | | | | | | | | |
| Pigment Dispersion 14 | | | | | | | | | |
| Pigment Dispersion 15 | | 20.0 | 20.0 | | | | | | |
| Pigment Dispersion 17 | | | | | | 20.0 | | | |
| Glycerol | 7.0 | 7.0 | 7.0 | 7.0 | 7.0 | 7.0 | 8.0 | 8.0 | |
| 2-Pyrrolidone | 5.0 | 5.0 | 5.0 | 5.0 | 5.0 | 5.0 | 6.0 | 3.0 | 2.0 |
| Ethylene glycol | 2.0 | 2.0 | 2.0 | 2.0 | 2.0 | 2.0 | 3.0 | 4.5 | |
| Polyethylene glycol (*1) | 3.0 | 3.0 | 3.0 | 3.0 | 3.0 | 3.0 | | 3.0 | 2.0 |
| Acetylenol EH (*2) | 0.7 | 0.7 | 0.7 | 1.0 | 1.1 | 0.7 | 0.7 | 0.7 | 0.7 |
| Polymer A | | 0.1 | 0.2 | | | | | | |
| Water | 47.3 | 62.2 | 62.1 | 62.0 | 61.9 | 62.3 | 62.3 | 60.8 | 75.3 |
| Pigment content [mass %] | 3.5 | 2.0 | 2.0 | 2.0 | 2.0 | 2.0 | 2.0 | 2.0 | 2.0 |
| Polymer content [mass %] | 3.15 | 0.5 | 0.6 | 1.8 | 1.8 | 1.8 | 1.8 | 1.8 | 1.8 |
| Water-soluble organic solvent content [mass %] | 17.0 | 17.0 | 17.0 | 17.0 | 17.0 | 17.0 | 17.0 | 18.5 | 4.0 |
| Water content [mass %] | 75.6 | 79.8 | 79.7 | 78.2 | 78.1 | 78.5 | 78.5 | 77.0 | 91.5 |
| Polymer/pigment [%] (*3) | 90.0 | 25.0 | 30.0 | 90.0 | 90.0 | 90.0 | 90.0 | 90.0 | 90.0 |
| Water-soluble organic solvent/pigment (*4) | 4.9 | 8.5 | 8.5 | 8.5 | 8.5 | 8.5 | 8.5 | 9.3 | 2.0 |

(*1) Weight average molecular weight: 1,000
(*2) Acetylene glycol ethylene oxide adduct (surfactant; product of Kawaken Fine Chemicals Co., Ltd.)
(*3) (Content of polymer/content of pigment) [%]
(*4) (Content of water-soluble organic solvent/content of pigment) [times].

(Evaluation of the First Inks according to the First Method)

(1) Continuous Ejection Stability

Each of the inks obtained above was charged into an ink cartridge, and the ink cartridge was installed in an ink jet recording apparatus "PIXUS 990i" (manufactured by Canon Inc.) that ejects an ink by an action of thermal energy. A solid image of 19 cm×26 cm was then recorded on 400 sheets of A4-sized PPC paper Office Planner (product of Canon Inc.). At this time, a nozzle check pattern of PIXUS 990 i was recorded after the recording on the 200-th sheet and the 400-th sheet. The resultant nozzle check patterns were visually observed to evaluate the ink as to continuous ejection stability. The evaluation criteria of the ejection stability are as follows. The results of the evaluation are shown in Table 4.

A: No disorder was observed on the nozzle check patterns, and normal recording can be conducted;

B: Some disorder was observed on the nozzle check patterns, but no ejection failure occurs;

C: Ejection failure and disorder were clearly observed on the nozzle check patterns, and normal recording cannot be conducted.

(2) Deposit

Each of the inks obtained above was charged into an ink cartridge, and the ink cartridge was installed in an ink jet recording apparatus "PIXUS 990i" (manufactured by Canon Inc.) that ejects an ink by an action of thermal energy. A solid image of 19 cm×26 cm was then recorded on 400 sheets of A4-sized PPC paper Office Planner (product of Canon Inc.). At this time, a recording head was taken out of the ink jet recording apparatus after the recording on the 200-th sheet and the 400-th sheet, and the interior of each nozzle was observed through an optical microscope to check the presence of deposit. Further, 50 nozzles were optionally selected before the recording and after the recording on the 200-th sheet and the 400-th sheet, respectively, and 40,000 ink droplets were ejected from each nozzle to find the mass per one ink droplet before and after the ejection in the following manner. First, the change of mass of the ink cartridge between before and after the ejection of the 40,000 ink droplets was measured to determine the mass per one ink droplet from the number of all the ink droplets ejected. Rates of change of the mass per one ink droplet between before the recording and after the recording on the 200-th sheet and the 400-th sheet were respectively found to evaluate the ink using these values. The evaluation criteria of the deposit are as follows. The results of the evaluation are shown in Table 4.

A: Deposit was scarcely formed;

B: It was confirmed that deposit is somewhat present on nozzle walls, but the rate of change of the mass per one ink droplet was less than 5.0% when the mass before the recording was compared with the mass after the recording on the 200-th sheet or the mass after the recording on the 400-th sheet;

C: It was confirmed that deposit is wholly present within the nozzles, and the rate of change of the mass per one ink droplet was 5.0% or more when the mass before the recording was compared with the mass after the recording on the 200-th sheet or the mass after the recording on the 400-th sheet.

(3) Sticking Recovery Property

Each of the inks obtained above was charged into an ink cartridge, and the ink cartridge was installed in an ink jet recording apparatus "PIXUS 990i" (manufactured by Canon Inc.) that ejects an ink by an action of thermal energy. A solid image of 19 cm×26 cm was then recorded on 400 sheets of A4-sized PPC Paper Office Planner (product of Canon Inc.). Thereafter, the ink was left to stand for 2 weeks under conditions of a temperature of 35° C. and a humidity of 10% in a state that the ink cartridge had been installed in the ink jet recording apparatus as it is. After a recovery operation was then suitably conducted, a nozzle check pattern of PIXUS 990 i was recorded. The resultant nozzle check pattern was visually observed to confirm the condition of recording by the ink ejected from each nozzle, thereby evaluating the ink as to sticking recovery property. The evaluation criteria of the sticking recovery property are as follows. The results of the evaluation are shown in Table 4.

A: All nozzles were recovered without problems by conducting manual purging at most 2 times to permit ejection;

B: All nozzles were recovered by conducting manual purging at least 3 times to permit ejection, but some disorder was observed on the nozzle check patterns in a part of the nozzles;

C: Ejection was impossible from a part of the nozzles even when manual purging was conducted at least 5 times.

TABLE 4

| | | | Results of evaluation | | | |
|---|---|---|---|---|---|---|
| | | Ink | Continuous ejection | | Deposit | | Sticking recovery property |
| | | | 200 sheets | 400 sheets | 200 sheets | 400 sheets | |
| Example | 1 | 1 | B | B | A | B | A |
| | 2 | 2 | B | B | A | B | A |
| | 3 | 3 | A | B | A | A | A |
| | 4 | 4 | B | B | A | A | B |
| | 5 | 5 | B | B | A | B | A |
| | 6 | 6 | A | B | A | A | A |
| | 7 | 7 | B | B | A | B | A |
| | 8 | 8 | B | B | A | B | A |
| | 9 | 9 | B | B | A | B | A |
| | 10 | 10 | B | B | A | B | A |
| | 11 | 11 | B | B | A | B | A |
| | 12 | 12 | B | B | A | B | A |
| | 13 | 13 | B | B | A | B | A |
| | 14 | 14 | B | B | A | B | A |
| | 15 | 15 | A | B | A | B | A |
| | 16 | 16 | B | B | A | A | A |
| Comp. Ex. | 1 | 17 | B | C | B | C | A |
| | 2 | 18 | B | B | A | A | C |

As apparent from Table 4, the results of the evaluation as to the deposit in Examples 3 and 4 were the same. However, when the amounts of the deposit caused after the solid image of 19 cm×26 cm was recorded on 400 sheets of the paper were compared with each other, the amount of the deposit caused in Example 4 was less. In addition, the amounts of the deposit caused after the recording on 400 sheets of the paper in Examples 10 and 11 were somewhat more compared with the other Examples. Further, the results of the evaluation as to the continuous ejection stability in Examples 9 and 10 were the same as the results of the evaluation as to the continuous ejection stability in other Examples than Examples 3, 6 and 15. However, the degree of dot misalignment of the nozzle check patterns was somewhat poor because the face surface after completion of the test was relatively wet. Furthermore, the inks of Examples 11 and 12 (Inks 11 and 12) were separately placed in a Teflon container, closely sealed and stored for one month in an oven kept to a temperature of 60° C. Particle sizes before and after the storage were measured by means of a particle size analyzer, ELS8000 (manufactured by OTSUKA ELECTRONICS Co., Ltd.) to determine the rate of change of the particle size in each ink. As a result, the rate of change of the particle size in Example 12 was smaller compared with the rate of change of the particle size in Example 11.

<Second Method>

(Preparation of the Second Inks according to the Second Method)

After their Corresponding Respective Components shown in Table 5 and 6 were mixed and sufficiently stirred, the resultant respective mixtures were filtered under pressure through a microfilter (product of Fuji Photo Film Co., Ltd.) having a pore size of 1.0 μm to prepare Inks 19 to 38. In order to more clarify the constitution of each ink, respective contents of the pigment, polymer, water and water-soluble organic solvent in the ink, and the value of (content of polymer/content of pigment) are shown in Tables 5 and 6 collectively. Herein, the content of the water-soluble organic solvent does not include the content of a surfactant.

TABLE 5

Compositions of Inks 19 to 28 (unit: %)

| | Ink | | | | | | | | | |
|---|---|---|---|---|---|---|---|---|---|---|
| | 19 | 20 | 21 | 22 | 23 | 24 | 25 | 26 | 27 | 28 |
| Pigment Dispersion 1 | 20.0 | | | | | | | | 20.0 | |
| Pigment Dispersion 2 | | 20.0 | | | | | | | | |
| Pigment Dispersion 3 | | | 20.0 | | | | | | | |
| Pigment Dispersion 4 | | | | 20.0 | | | | | | |
| Pigment Dispersion 5 | | | | | 20.0 | | | | | |
| Pigment Dispersion 6 | | | | | | 20.0 | | | | |
| Pigment Dispersion 7 | | | | | | | 20.0 | 20.0 | | 20.0 |
| Pigment Dispersion 8 | | | | | | | | | | |
| Pigment Dispersion 9 | | | | | | | | | | |
| Pigment Dispersion 10 | | | | | | | | | | |
| Pigment Dispersion 11 | | | | | | | | | | |

TABLE 5-continued

Compositions of Inks 19 to 28 (unit: %)

| | Ink 19 | 20 | 21 | 22 | 23 | 24 | 25 | 26 | 27 | 28 |
|---|---|---|---|---|---|---|---|---|---|---|
| Pigment Dispersion 15 | | | | | | | | | | |
| Pigment Dispersion 16 | | | | | | | | | | |
| Pigment Dispersion 18 | | | | | | | | | | |
| Glycerol | 8.0 | 8.0 | 8.0 | 8.0 | 8.0 | 8.0 | 8.0 | 8.0 | 3.0 | 9.0 |
| 2-Pyrrolidone | 3.0 | 3.0 | 3.0 | 3.0 | 3.0 | 3.0 | 3.0 | 3.0 | | 4.0 |
| Ethylene glycol | 6.0 | 6.0 | 6.0 | 6.0 | 6.0 | 6.0 | 6.0 | 3.0 | | 7.0 |
| Polyethylene glycol (*1) | 3.0 | 3.0 | 3.0 | 3.0 | 3.0 | 3.0 | 3.0 | 3.0 | 2.0 | |
| Acetylenol EH (*2) | 0.7 | 0.7 | 0.7 | 0.7 | 0.7 | 0.7 | 0.7 | 0.7 | 0.7 | 0.7 |
| Polymer D | | | | | | | | | | |
| Water | 59.3 | 59.3 | 59.3 | 59.3 | 59.3 | 59.3 | 59.3 | 62.3 | 74.3 | 59.3 |
| Pigment content [mass %] | 2.0 | 2.0 | 2.0 | 2.0 | 2.0 | 2.0 | 2.0 | 2.0 | 2.0 | 2.0 |
| Polymer content [mass %] | 1.8 | 1.8 | 1.8 | 1.8 | 1.8 | 1.8 | 1.8 | 1.8 | 1.8 | 1.8 |
| Water-soluble organic solvent content [mass %] | 20.0 | 20.0 | 20.0 | 20.0 | 20.0 | 20.0 | 20.0 | 17.0 | 5.0 | 20.0 |
| Water content [mass %] | 75.5 | 75.5 | 75.5 | 75.5 | 75.5 | 75.5 | 75.5 | 78.5 | 90.5 | 75.5 |
| Polymer/pigment [%] (*3) | 90.0 | 90.0 | 90.0 | 90.0 | 90.0 | 90.0 | 90.0 | 90.0 | 90.0 | 90.0 |

(*1) Weight average molecular weight: 1,000
(*2) Acetylene glycol ethylene oxide adduct (surfactant; product of Kawaken Fine Chemicals Co., Ltd.)
(*3) (Content of polymer/content of pigment) [%].

TABLE 6

Compositions of Inks 29 to 38 (unit: %)

| | Ink 29 | 30 | 31 | 32 | 33 | 34 | 35 | 36 | 37 | 38 |
|---|---|---|---|---|---|---|---|---|---|---|
| Pigment Dispersion 1 | | | | | | | | | | |
| Pigment Dispersion 2 | | | | | | | | | | |
| Pigment Dispersion 3 | | | | | | | | | | |
| Pigment Dispersion 4 | | | | | | | | | | |
| Pigment Dispersion 5 | | | | | | | | | | |
| Pigment Dispersion 6 | | | | | | | | | | |
| Pigment Dispersion 7 | | 20.0 | | | | | | | | |
| Pigment Dispersion 8 | | | | | | | 20.0 | | | |
| Pigment Dispersion 9 | | | | | | | | 20.0 | | |
| Pigment Dispersion 10 | | | | | | | | | 20.0 | |
| Pigment Dispersion 11 | | | | | | | | | | 20.0 |
| Pigment Dispersion 15 | 20.0 | 20.0 | | | | | | | | |
| Pigment Dispersion 16 | | | | 20.0 | 20.0 | | | | | |
| Pigment Dispersion 18 | | | | | | 20.0 | | | | |
| Glycerol | 8.0 | 8.0 | 8.0 | 8.0 | 8.0 | 8.0 | 8.0 | 8.0 | 8.0 | 8.0 |
| 2-Pyrrolidone | 3.0 | 3.0 | 3.0 | 3.0 | 3.0 | 3.0 | 3.0 | 3.0 | 3.0 | 3.0 |
| Ethylene glycol | 6.0 | 6.0 | 6.0 | 6.0 | 6.0 | 6.0 | 6.0 | 6.0 | 6.0 | 6.0 |
| Polyethylene glycol (*1) | 3.0 | 3.0 | 3.0 | 3.0 | 3.0 | 3.0 | 3.0 | 3.0 | 3.0 | 3.0 |
| Acetylenol EH (*2) | 0.7 | 0.7 | 0.7 | 0.7 | 0.7 | 0.7 | 0.7 | 0.7 | 0.7 | 0.7 |
| Polymer D | 0.1 | 0.2 | 0.1 | 0.1 | 0.2 | | | | | |
| Water | 59.2 | 59.1 | 59.2 | 59.2 | 59.1 | 59.3 | 59.3 | 59.3 | 59.3 | 59.3 |
| Pigment content [mass %] | 2.0 | 2.0 | 2.0 | 2.0 | 2.0 | 2.0 | 2.0 | 2.0 | 2.0 | 2.0 |
| Polymer content [mass %] | 0.5 | 0.6 | 1.9 | 0.5 | 0.6 | 1.8 | 1.8 | 1.8 | 1.8 | 1.8 |
| Water-soluble organic solvent content [mass %] | 20.0 | 20.0 | 20.0 | 20.0 | 20.0 | 20.0 | 20.0 | 20.0 | 20.0 | 20.0 |
| Water content [mass %] | 76.8 | 76.7 | 75.4 | 76.8 | 76.7 | 75.5 | 75.5 | 75.5 | 75.5 | 75.5 |
| Polymer/pigment [%] (*3) | 25.0 | 30.0 | 95.0 | 25.0 | 30.0 | 90.0 | 90.0 | 90.0 | 90.0 | 90.0 |

(*1) Weight average molecular weight: 1,000
(*2) Acetylene glycol ethylene oxide adduct (surfactant; product of Kawaken Fine Chemicals Co., Ltd.)
(*3) (Content of polymer/content of pigment) [%].

(Measurement of Absorbance)

With respect to a diluted ink obtained by 1500-times (by mass) diluting each of the inks obtained above with ion-exchanged water, the absorbance was measured in a wavelength range of from 400 nm or more to 700 nm or less using a spectrophotometer (trade name: U-3300, manufactured by Hitachi Ltd.). The results of the measurement are shown in Table 7. As apparent from Table 7, Inks 19 to 34 are inks of Examples satisfying the requirements defined in the second method of the present invention. On the other hand, Inks 35 to 38 are inks of Comparative Examples.

TABLE 7

Measured results of absorbance

|     | 530–540 (*4) | 550–570 (*5) | 620–630 (*6) | Absorbance (A) | Absorbance (B) | Absorbance (C) | (B)/(A) | (C)/(A) |
|---|---|---|---|---|---|---|---|---|
| Ink 19 | 535.0 | 562.5 | 625.0 | 1.01 | 0.98 | 0.43 | 0.97 | 0.43 |
| 20 | 533.5 | 562.0 | 624.5 | 1.02 | 0.95 | 0.39 | 0.93 | 0.38 |
| 21 | 534.0 | 562.0 | 624.5 | 1.02 | 0.95 | 0.40 | 0.93 | 0.39 |
| 22 | 535.0 | 562.5 | 625.0 | 1.01 | 0.97 | 0.41 | 0.96 | 0.41 |
| 23 | 535.0 | 562.5 | 625.0 | 1.01 | 0.97 | 0.41 | 0.96 | 0.41 |
| 24 | 535.0 | 562.5 | 625.0 | 1.01 | 0.97 | 0.41 | 0.96 | 0.41 |
| 25 | 535.0 | 562.5 | 625.0 | 1.01 | 0.97 | 0.41 | 0.96 | 0.41 |
| 26 | 535.0 | 562.5 | 625.0 | 1.01 | 0.97 | 0.41 | 0.96 | 0.41 |
| 27 | 535.0 | 562.5 | 625.0 | 1.01 | 0.98 | 0.43 | 0.97 | 0.43 |
| 28 | 535.0 | 562.5 | 625.0 | 1.01 | 0.97 | 0.41 | 0.96 | 0.41 |
| 29 | 535.0 | 562.5 | 625.0 | 1.03 | 1.00 | 0.43 | 0.97 | 0.42 |
| 30 | 535.0 | 562.5 | 625.0 | 1.03 | 1.00 | 0.43 | 0.97 | 0.42 |
| 31 | 535.0 | 562.5 | 625.0 | 1.01 | 0.97 | 0.41 | 0.96 | 0.41 |
| 32 | 535.0 | 562.5 | 625.0 | 1.01 | 0.97 | 0.41 | 0.96 | 0.41 |
| 33 | 535.0 | 562.5 | 625.0 | 1.01 | 0.97 | 0.41 | 0.96 | 0.41 |
| 34 | 534.0 | 562.0 | 624.5 | 1.01 | 0.96 | 0.40 | 0.95 | 0.40 |
| 35 | 533.0 | 561.0 | 624.0 | 1.07 | 0.98 | 0.42 | 0.92 | 0.39 |
| 36 | 533.0 | 561.0 | 623.0 | 1.09 | 0.97 | 0.40 | 0.89 | 0.37 |
| 37 | 535.5 | 563.5 | 625.5 | 1.00 | 0.98 | 0.44 | 0.98 | 0.44 |
| 38 | 535.5 | 563.5 | 626.0 | 0.99 | 0.99 | 0.45 | 1.00 | 0.45 |

(*4) Maximum absorption wavelength [nm] located in a wavelength range of from 530 nm or more to 540 nm or less
(*5) Maximum absorption wavelength [nm] located in a wavelength range of from 550 nm or more to 570 nm or less
(*6) Maximum absorption wavelength [nm] located in a wavelength range of from 620 nm or more to 630 nm or less.

(Evaluation of the Second Inks According to the Second Method)

Each of the inks obtained above was evaluated as to continuous ejection stability, deposit and sticking recovery property in the same manner as described above. The results of the evaluation are shown in Table 8.

TABLE 8

Results of evaluation

|  |  | Continuous ejection stability | | Deposit | | Sticking |
|---|---|---|---|---|---|---|
|  | Ink | 200 sheets | 400 sheets | 200 sheets | 400 sheets | recovery property |
| Example 17 | 19 | A | A | B | B | A |
| 18 | 20 | A | A | A | B | A |
| 19 | 21 | A | A | A | B | A |
| 20 | 22 | A | A | A | B | A |
| 21 | 23 | A | A | A | B | A |
| 22 | 24 | A | A | A | A | A |
| 23 | 25 | A | A | A | A | A |
| 24 | 26 | A | A | A | A | A |
| 25 | 27 | A | A | B | B | B |
| 26 | 28 | B | B | A | A | A |
| 27 | 29 | A | A | A | B | A |
| 28 | 30 | A | A | A | A | A |
| 29 | 31 | A | A | A | A | A |
| 30 | 32 | A | A | A | A | A |
| 31 | 33 | A | A | A | A | A |
| 32 | 34 | A | A | A | B | A |
| Comp. Ex. 3 | 35 | B | C | B | C | A |
| 4 | 36 | C | C | C | C | A |
| 5 | 37 | B | C | B | C | A |
| 6 | 38 | C | C | C | C | A |

As apparent from Table 8, deposit scarcely occurred in Examples 22 to 24 and 29, and the inks were far excellent. In particular, in Example 24 (Ink 26), the rate of change of the mass per one ink droplet between before and after the solid image of 19 cm×26 cm was recorded on 400 sheets of the paper was 1% or less. This value is recognized to be better compared with about 2.7% in Example 22 (Ink 24) and about 2.2% in Examples 23 and 29 (Inks 25 and 31). The results of the evaluation as to the deposit after recorded on 400 sheets of the paper in Examples 17 to 21 and after recorded on 200 sheets of the paper in Comparative Examples 3 and 5 were all 'B'. However, the amounts of the deposit caused after recorded on 400 sheets of the paper in Examples 17 to 21 were clearly less compared with the amounts of the deposit caused after recorded on 200 sheets of the paper in Comparative Examples 3 and 5. Incidentally, the result of the evaluation as to the continuous ejection stability in Example 29 was 'A', and lowering of the ejection stability due to the deposit was scarcely recognized. However, the degree of dot misalignment of the nozzle check pattern in Example 29 was somewhat poor compared with other Examples in which the continuous ejection stability was 'A' because the face surface after completion of the test was relatively wet. Furthermore, the inks of Examples 27 and 28 (Inks 29 and 30) were separately placed in a Teflon container, closely sealed and stored for one month in an oven kept to a temperature of 60° C. Particle sizes before and after the storage were measured by means of a particle size analyzer, ELS8000 (manufactured by OTSUKA ELECTRONICS Co., Ltd.) to determine the rate of change of the particle size in each ink. As a result, the rate of change of the particle size in Example 28 was less compared with the rate of change of the particle size in Example 28. Furthermore, the inks (Inks 32 and 33) of Examples 30 and 31 were separately placed in a Teflon container, closely sealed and stored for one month in an oven kept to a temperature of 60° C. Particle sizes before and after the storage were measured by means of the particle size analyzer, ELS8000 (manufactured by OTSUKA ELECTRONICS Co., Ltd.) to determine the rate of change of the particle size in each ink. As a result, the rate of change of the particle size in Example 31 was less compared with the rate of change of the particle size in Example 30.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-038264, filed Feb. 15, 2006, and 2006-038199, filed Feb. 15, 2006 which are hereby incorporated by reference herein in their entirety.

What is claimed is:

1. An aqueous ink to be used in an ink jet recording method that an ink is ejected from a recording head by action of thermal energy,
wherein the ink comprises a pigment, a block polymer and a water-soluble organic solvent,
wherein a hydrophilicity δm of the pigment falls within a range of from 21.5 or more to 23.5 or less,
wherein the pigment is C.I. Pigment Violet 23,
wherein a content (mass %) of the water-soluble organic solvent is from 5.0 mass % or more to 17.5 mass % or less with respect to the whole mass of the aqueous ink, and
wherein the water-soluble organic solvent comprises polyethylene glycol having a weight average molecular weight of 1,000 or more.

2. The aqueous ink according to claim 1, wherein the block polymer has a weight average molecular weight of from 2,000 or more to 5,000 or less.

3. An aqueous ink to be used in an ink jet recording method that an ink is ejected from a recording head by the action of thermal energy,
wherein the ink comprises a pigment, a block polymer and a water-soluble organic solvent,
wherein the pigment is C.I. Pigment Violet 23,
wherein a content (mass %) of the water-soluble organic solvent is from 5.0 mass % or more to 17.5 mass % or less with respect to the whole mass of the aqueous ink, and
wherein the water-soluble organic solvent comprises polyethylene glycol having a weight average molecular weight of 1,000 or more.

4. An aqueous ink to be used in an ink jet recording method that an ink is ejected from a recording head by the action of thermal energy,
wherein the ink comprises C.I. Pigment Violet 23 and has a maximum absorption wavelength each in a wavelength range of from 530 nm or more to 540 nm or less and in a wavelength range of from 550 nm or more to 570 nm or less, and
wherein a relationship between an absorbance (A) at the maximum absorption wavelength located in the wavelength range of from 530 nm or more to 540 nm or less and an absorbance (B) at the maximum absorption wavelength located in the wavelength range of from 550 nm or more to 570 nm or less satisfies conditions of the following expression (1):

$$0.93 \leq (B)/(A) \leq 0.97 \qquad (1),$$

wherein the ink further comprises a block polymer and a water-soluble organic solvent which comprises polyethylene glycol having a weight average molecular weight of 1,000 or more.

5. The aqueous ink according to claim 4, wherein the ink has a maximum absorption wavelength each in a wavelength range of from 530 nm or more to 540 nm or less and in a wavelength range of from 620 nm or more to 630 nm or less, and
a relationship between an absorbance (A) at the maximum absorption wavelength located in the wavelength range of from 530 nm or more to 540 nm or less and an absorbance (C) at the maximum absorption wavelength located in the wavelength range of from 620 nm or more to 630 nm or less satisfies conditions of the following expression (2):

$$0.39 \leq (C)/(A) \leq 0.41 \qquad (2).$$

6. The aqueous ink according to claim 4, wherein a hydrophilicity δm of the C.I. Pigment Violet 23 falls within a range of from 21.5 or more to 23.5 or less.

7. The aqueous ink according to claim 6, wherein the block polymer has a weight average molecular weight of from 2,000 or more to 5,000 or less.

8. The aqueous ink according to claim 4, wherein a content (mass %) of the water-soluble organic solvent is from 5.0 mass % or more to 17.5 mass % or less with respect to the whole mass of the aqueous ink.

9. An ink jet recording method comprising ejecting an ink by action of thermal energy to conduct recording on a recording medium, wherein the ink is the aqueous ink according to claim 1.

10. An ink cartridge comprising an ink storage portion storing an ink, wherein the ink is the aqueous ink according to claim 1.

11. A recording unit comprising an ink storage portion storing an ink and a recording head for ejecting the ink by action of thermal energy, wherein the ink is the aqueous ink according to claim 1.

12. An ink jet recording apparatus comprising an ink storage portion storing an ink and a recording head for ejecting the ink by action of thermal energy, wherein the ink is the aqueous ink according to claim 1.

13. An ink jet recording method comprising ejecting an ink by action of thermal energy to conduct recording on a recording medium, wherein the ink is the aqueous ink according to claim 4.

14. An ink cartridge comprising an ink storage portion storing an ink, wherein the ink is the aqueous ink according to claim 4.

15. A recording unit comprising an ink storage portion storing an ink and a recording head for ejecting the ink by action of thermal energy, wherein the ink is the aqueous ink according to claim 4.

16. An ink jet recording apparatus comprising an ink storage portion storing an ink and a recording head for ejecting the ink by action of thermal energy, wherein the ink is the aqueous ink according to claim 4.

17. The aqueous ink according to claim 3, wherein the block polymer has a weight average molecular weight of from 2,000 to 5,000 or less.

* * * * *